US008782077B1

(12) United States Patent
Rowley et al.

(10) Patent No.: US 8,782,077 B1
(45) Date of Patent: Jul. 15, 2014

(54) QUERY IMAGE SEARCH

(75) Inventors: Henry Allan Rowley, Sunnyvale, CA (US); Charles J. Rosenberg, Cupertino, CA (US); Anelia Angelova, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 6 days.

(21) Appl. No.: 13/438,879

(22) Filed: Apr. 4, 2012

Related U.S. Application Data

(60) Provisional application No. 61/495,856, filed on Jun. 10, 2011, provisional application No. 61/496,364, filed on Jun. 13, 2011, provisional application No. 61/497,008, filed on Jun. 14, 2011.

(51) Int. Cl.
*G06F 17/30* (2006.01)

(52) U.S. Cl.
USPC .......................................... 707/769

(58) Field of Classification Search
None
See application file for complete search history.

(56) References Cited

U.S. PATENT DOCUMENTS

| 6,760,724 | B1 * | 7/2004 | Chakrabarti et al. ................. 1/1 |
| 7,460,735 | B1 | 12/2008 | Rowley et al. |
| 8,171,043 | B2 | 5/2012 | Murdock et al. |
| 8,429,173 | B1 | 4/2013 | Rosenberg et al. |
| 2005/0055344 | A1 | 3/2005 | Liu et al. |
| 2006/0101060 | A1 * | 5/2006 | Li et al. ........................ 707/102 |
| 2007/0078846 | A1 * | 4/2007 | Gulli et al. ........................ 707/5 |
| 2007/0266087 | A1 | 11/2007 | Hamynen |
| 2008/0126486 | A1 | 5/2008 | Heist et al. |
| 2008/0288509 | A1 * | 11/2008 | Mysen et al. ................. 707/100 |
| 2008/0301128 | A1 | 12/2008 | Gandert |
| 2009/0063455 | A1 | 3/2009 | Li et al. |
| 2009/0208097 | A1 | 8/2009 | Husseini et al. |
| 2010/0191769 | A1 | 7/2010 | Koyama et al. |
| 2010/0202705 | A1 * | 8/2010 | Fukuhara et al. ............. 382/218 |
| 2011/0072047 | A1 | 3/2011 | Wang |
| 2011/0128288 | A1 | 6/2011 | Petrou |
| 2011/0167053 | A1 | 7/2011 | Lawler |
| 2011/0191336 | A1 | 8/2011 | Wang |
| 2012/0155717 | A1 | 6/2012 | Ma |

OTHER PUBLICATIONS

Wang et al., "SIMPLIcity: Semantics-Sensitive Integrated Matching for Picture Libraries", Sep. 2001, IEEE Transactions on Pattern Analysis and Machine Intelligence, vol. 23, No. 9, pp. 947-963.*
Jacobs et al., "Fast Multiresolution Image Querying", Department of Computer Science and Engineering, University of Washington, Undated.

(Continued)

*Primary Examiner* — Rehana Perveen
*Assistant Examiner* — Hung Havan
(74) *Attorney, Agent, or Firm* — Fish & Richardson P.C.

(57) ABSTRACT

In general, in one aspect, a method includes receiving a query image, accessing a database of hash values of other images, determining a hash value for the query image by applying a hash function to a bit-vector of data representing signs of a subset of wavelet coefficients collected from the query image, the subset corresponding to wavelet coefficients having greatest magnitude, comparing the hash value of the query image to the hash values of the database, and based on the comparison, identifying as near duplicate images one or more of the other images having a hash value that matches the hash value of the query image. This and other implementations of this aspect can include corresponding systems, apparatus, and computer program products.

27 Claims, 17 Drawing Sheets

(56) References Cited

OTHER PUBLICATIONS

Jacobs et al., "Fast Multiresolution Image Querying", grail.cs.washington.edu/projects/query/06/06/11.

Jacobs et al., 'Fast Multiresolution Image Querying,' Department of Computer Science and Engineering, University of Washington, Technical Report 95-01-06, Jan. 24, 1995, Revised May 20, 1995, 11 pages.

* cited by examiner

QUERY IMAGE SEARCH

RELATED APPLICATION DATA

This application claims the benefit under 35 U.S.C. §119 (e) of U.S. Provisional Application Ser. No. 61/495,856, filed on Jun. 10, 2011, and U.S. Provisional Application Ser. No. 61/496,364, filed on Jun. 13, 2011, and U.S. Provisional Application Ser. No. 61/497,008, filed on Jun. 14, 2011. The contents of these applications are all hereby incorporated by reference.

BACKGROUND

This specification relates to digital information retrieval, and particularly to processing search results.

The Internet provides access to a wide variety of resources such as video or audio files, web pages for particular subjects, book articles, or news articles. A search system can identify resources in response to a text query that includes one or more search terms or phrases. The search system ranks the resources based on their relevance to the query and on measures of quality of the resources and provides search results that link to the identified resources. The search results are typically ordered for viewing according to the rank.

To search image resources, a search system can determine the relevance of an image to a text query based on the textual content of the resource in which the image is located and also based on relevance feedback associated with the image.

SUMMARY

In general, in one aspect, a method includes receiving, at one or more processors, a query image, accessing, at the one or more processors, a database of hash values of other images, determining, at the one or more processors, a hash value for the query image by applying a hash function to a bit-vector of data representing signs of a subset of wavelet coefficients collected from the query image, the subset corresponding to wavelet coefficients having greatest magnitude, comparing, at the one or more processors, the hash value of the query image to the hash values of the database, and based on the comparison, identifying, at the one or more processors, as near duplicate images other images having a hash value that matches the hash value of the query image. This and other implementations of this aspect can include corresponding systems, apparatus, and computer program products.

Implementations of this aspect may include one or more of the following features. The bit-vector of data includes two-bit values each representing a sign of a wavelet coefficient among the subset of wavelet coefficients. The hash value includes a smaller number of bits than the bit-vector. The bit-vector of data further includes data representing an average color of the image. The bit-vector of data further includes data representing an aspect ratio of the image. The method includes removing a uniform color border of the query image before computing the hash value of the query image. The database of hash values of other images stores hash values in association with references to the other images. The references to the other images are stored in association with references to web pages each containing at least one of the other images. The query image is received in response to a selection on a client device of the query image, the query image displayed within a web page displayed on the client device.

Particular implementations of the subject matter described in this specification can be implemented so as to realize one or more of the following advantages. A query image can be used to obtain information about the image itself as well as to obtain information related to the image, for example, related to a topic of the image.

The details of one or more implementations are set forth in the accompanying drawings and the description below. Other features, aspects, and advantages will be apparent from the description and drawings, and from the claims.

DESCRIPTION OF DRAWINGS

Like reference symbols in the various drawings indicate like elements.

DETAILED DESCRIPTION

A query image can be an image file, such as a jpeg file, that is used by a search engine as input to a search processing operation. Search results can be obtained by processing the query image and identifying resources related to the query image. A query image can be submitted to a search processing operation in place of or in addition to a textual search query.

A search processing operation that provides search results responsive to a query image can provide information of interest to a user about the query image. For example, the search processing operation can find information available on the Internet describing the query image, such as an origin, creator, or artist of an image; other versions of the query image such as cropped, edited, or different resolution versions of the query image; companies, organizations, or other entities related to the query image, e.g., if the query image is a logo, news stories related to the query image; or identities of subjects of an image such as people or objects portrayed in the query image. If the query image is submitted to a search processing operation along with a textual search query, the textual search query can further refine the search results to be of greatest interest to a user.

The search results responsive to a query image could include a label describing a topic of the query image, search results responsive to the label itself which may relate to a topic of the query image, images that are visually similar to the query image, and resources such as web pages that contain the query image or near duplicate images of the query image.

Figure 1A:
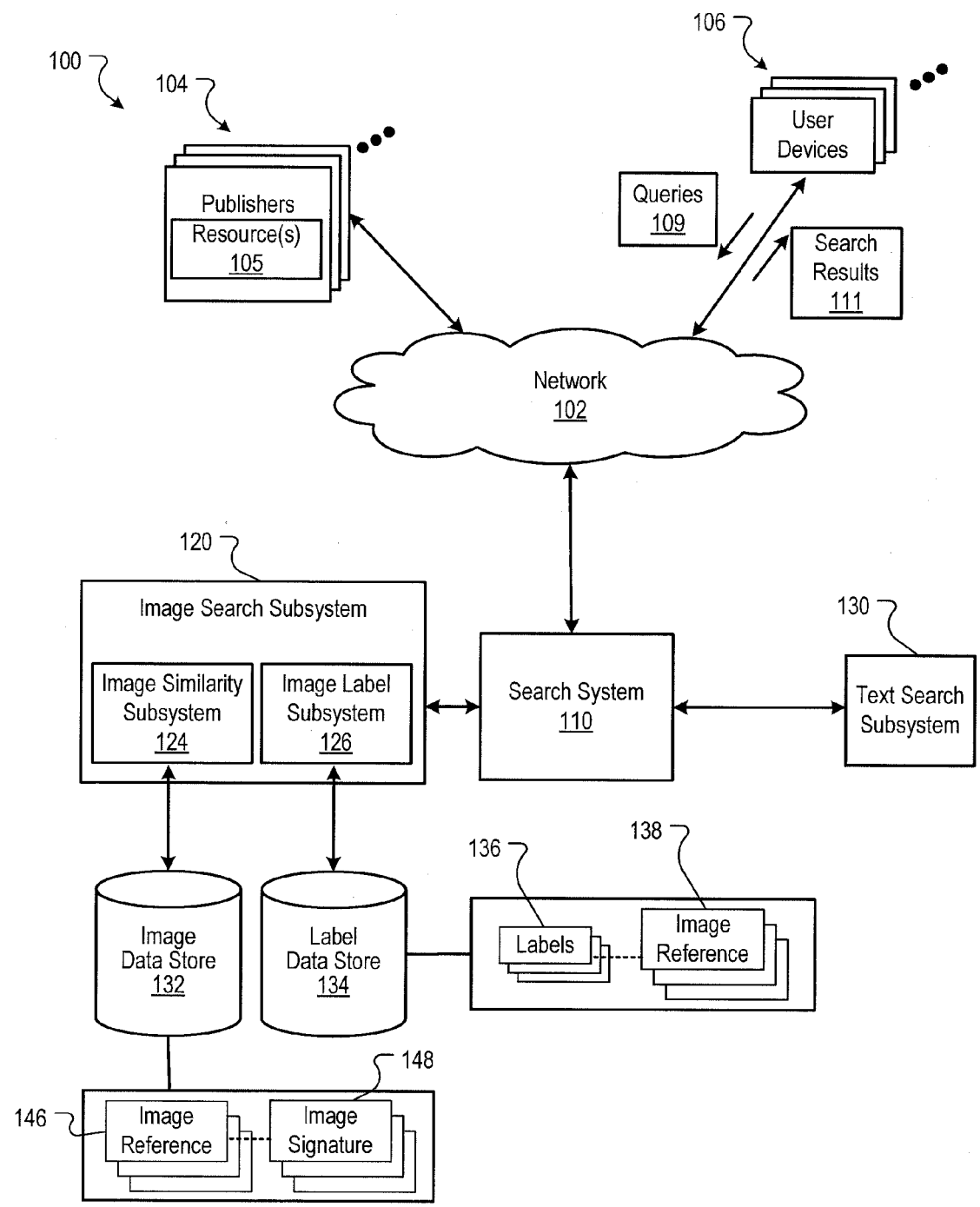
FIG. 1A is a block diagram of an example environment in which a search system provides search services.

FIG. 1A is a block diagram of an example environment 100 in which a search system 110 provides search services. The example environment 100 includes a network 102, e.g., a local area network (LAN), wide area network (WAN), the Internet, or a combination of them, connects publishers 104, user devices 106, and the search system 110. The environment 100 may include many thousands of web sites 104 and user devices 106, which are also sometimes referred to as client devices.

A web site 104 is one or more resources 105 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 105 is any data that can be provided by the web site 104 over the network 102 and that is associated with a resource address. Resources 105 include HTML pages, word processing documents, and portable document format (PDF) documents, images, video, and feed sources, to name just a few. The resources 105 can include content, e.g., words, phrases, images and sounds and may include embedded information, e.g., meta information and hyperlinks, and/or embedded instructions, e.g., scripts.

A user device 106 is an electronic device that is under control of a user and is capable of requesting and receiving resources 105 over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources 105, the search system 110 identifies the resources by crawling and indexing the resources 105 provided by the web sites 104. Data about the resources 105 can be indexed based on the resource 105 to which the data corresponds.

The user devices 106 submit search queries 109 to the search system 110. In response, the search system 110 identifies resources 105 that are responsive to, e.g., have at least a threshold relevance score for, the search query 109. The search system 110 generates search results 111 that identify the resources 105 and returns the search results 111 to the user devices 106. A search result 111 is data generated by the search system 110 that identifies a resource 105 that is responsive to a particular search query, and includes a link to the resource 105. An example search result 111 can include a web page title, a snippet of text or a portion of an image extracted from the web page, and the URL of the web page.

Search results 111 are ranked based on scores related to the resources 105 identified by the search results 111, such as information retrieval ("IR") scores, and optionally a quality score of each resource 105 relative to other resources 105. In some implementations, the IR scores are computed from dot products of feature vectors corresponding to a search query 109 and a resource 105, and the ranking of the search results 111 is based on relevance scores that are a combination, e.g., sums, products, or other mathematical combinations, of the IR scores and quality scores. In some examples, the search results 111 can be ordered at least partially according to these relevance scores and provided to the user device according to the order.

The user devices 106 receive the search results 111, e.g., in the form of one or more web pages, and render the pages for presentation to users. In response to the user selecting a link in a search result 111 at a user device 106, the user device 106 requests the resource 105 identified by the link. The web site 104 hosting the resource 105 receives the request for the resource 105 from the user device 106 and provides the resource 105 to the requesting user device 106.

In some implementations, a search query 109 can include data for a single query type or for two or more query types, e.g., types of data in the query. For example, the search query 109 may have a text portion, and the search query may also have an image portion. A search query 109 that includes data for two or more query types can be referred to as a "hybrid query." In some examples, a search query 109 includes data for only one type of query. For example, the search query 109 may only include image query data, e.g., a query image, or the search query may only include textual query data, e.g., a text query.

In some implementations, the search system 110 includes an image search subsystem 120 that is used to process query images or other image query data to identify images that are both visually and semantically related to the query image. For example, a query 109 may include a query image with which the search system 110 can perform an image search, e.g., a search for images that are responsive to the query image. The image search subsystem 120 may also process the query image to identify search results 111 that are responsive to the query image.

The term "semantic relatedness" refers to the relatedness between text and images. A portion of text and an image are semantically related if the text describes a topic of an image or otherwise has a relationship with the content of the image. Generally, text is semantically related to an image if the text is similar to or relevant to a topic of the image. For example, the text "fish" is semantically related to an image of a mackerel. The degree to which text is semantically related can be quantified. For example, a confidence score may use used to indicate the degree to which text is accurately related to an image.

In some implementations, the search system 110 also includes a text search subsystem 130 that is used to perform a search based on a text query, e.g., text submitted by the user devices 106 as a portion of a query 109. The text search subsystem 130 can also perform a search based on a label for an image that was submitted by a user device 106 as a portion—all or a proper subset—of a query 109. For example, as described below, the label could be a label associated with, e.g., indexed according to and/or stored with a reference to, the image by an image label subsystem 126.

An image label ("label") is data that is indicative of subject matter to which an image is relevant. Labels can be explicitly specified by a publisher of a web site 104 on which the image appears. Labels can also be generated, for example, based on text that appears near the image on the web page. For example, a label can be generated for an image based on text that is located adjacent to, e.g., within a threshold number of pixels of, the image or in a portion of a document that is identified as containing information relevant to the image, e.g., a frame in which the image is presented. A label can also be generated based on text that is included in the image or otherwise associated with the image, e.g., text included in a file name, text included in anchor text of a link to the image, or resource location of the image. The image label subsystem 126 can generate labels for images, as described below.

The image search subsystem 120 includes an image similarity subsystem 124 and an image label subsystem 126. As described in detail below, the image similarity subsystem 124 generates data indicative of the visual similarity of images to a query image, and the image label subsystem 126 generates labels, e.g., textual data, indicative of a topic or subject matter to which images are related.

The description that follows describes the image similarity subsystem 124, image label subsystem 126, as well as processes that can be implemented by these and other subsystems. These subsystems and related processes are described with reference to a search query that includes a query image and image search results that have been identified as responsive to the search query. However, each respective subsystem and process can be implemented with different processing systems and for different operational environments.

The image similarity subsystem 124 includes one or more processors configured to identify images that are visually similar to a query image received by the image similarity subsystem 124 as input. In some implementations, the image similarity subsystem 124 can identify visually similar images and near duplicate images.

Two images are visually similar if they have related visual features, e.g., features that have a level of similarity above a threshold value. For example, two images that have similar distributions of color, such as the colors of a daytime sky, may be visually related. As another example, two images that have similar patterns, such as the texture of a material such as concrete marble, may be visually related. Sometimes, two different images of the same physical object are visually similar images even if there are substantial differences between the two images. For example, two photographs of the same object taken at different angles can be visually similar images.

In contrast to visually similar images, near duplicate images can be images that are identical except for differences in the way the images have been processed. For example, near duplicate images may have a level of similarity above a second threshold value greater than a threshold value used for visually similar features, as described above. In general, the differences between two near duplicate images are differences other than differences in visual features of the images, as described above. For example, two identical images at different resolutions are near duplicate images. As another example, two images of the same object having different brightness, contrast, or other image attributes, e.g., image attributes adjusted in image processing software, can be near duplicate images. As another example, an uncropped version of an image and a cropped version of the same image, e.g., cropped to remove a border in the image, can be near duplicate images. The manner in which the image similarity subsystem 124 identifies images that are near duplicates of a query image are described below with respect to FIGS. 13-15.

The image similarity subsystem 124 has access to an image data store 132 with which the image similarity subsystem 124 identifies near-duplicate images and visually similar images for a query image. In some implementations, the image data store 132 is a database of images and/or data describing the images. In some implementations, the image data store 132 need not store copies of images, but can reference locations of the respective images available on the network 102. For example, the image data store 132 may store image references 146. An image reference 146 is data that can be used to locate an actual image file. For example, the image reference 146 may be a uniform resource locator (URL) referencing an image that can be accessed using the network 102, or the image reference 138 may be another kind of reference to an image file. The image references 146 can be stored in association with image signatures 148. An image signature 148 is a data value that can be computed from an image. A function, such as a hash function, can be provided an image as input, and the function will return the image signature 148 as output. The image signature 148 can be used to identify an image within the image data store 132. For example, an image can be provided to a function used to compute the image signature, and the returned image signature 148, along with a corresponding image reference 146, can be located in the image data store 132. Each image referenced by an image reference 146 is associated with a single image signature 148. However, a single image signature 148 may be associated with multiple image references 146, because the function used to compute the image signature 148 may return the same data value for multiple images. Generally, two images that are near duplicates will return the same image signature 148 when provided to a function that computes image signatures. The computation of image signatures 148 is described in further detail below with respect to FIGS. 13-15.

The image data store 132 may also contain references to web pages, e.g., web pages 104, containing the images, and the image similarity subsystem 124 can return references to web pages that contain an image that is responsive to the query image. For example, the image references 146 may include URLs of web pages containing the image associated with the respective image reference.

As described above, image labels can be used to identify images that are responsive to a query. However, misdescriptive labels, e.g., labels that do not accurately describe an image, can result in unrelated images being improperly identified as responsive to a search query. For example, if an image of a baseball and an image of an egg are each associated with a common label, e.g., "egg," then these images may both appear in search results responsive to a query image of an egg even though the label "egg" is unrelated to the image of the baseball.

Misdescriptive labels may be purposely associated with images by users, for example, to direct traffic to a particular resource, or inadvertently associated with the image when the label is generated based on text that appears with the image, but is unrelated to the image. Regardless of how an image is associated with a misdescriptive label, identifying images as responsive to a search based on misdescriptive labels can negatively affect the quality of image search results.

In some implementations, the image label subsystem 126 includes one or more processors that are configured to select labels that accurately describe images and store the labels in association with the images, e.g., maintain a database of labels each associated with a reference to an image. The image label subsystem 126 maintains a label data store 134 which stores labels 136 that are semantically related to images. Each label 136 is stored in association with, e.g., indexed according to and/or stored with a reference to, data describing or identifying one or more images. For example, each of the labels 136 can be stored in association with an image reference 138. The image reference 138 is data that can be used to locate an actual image file. In some examples, the image reference 138 may be a uniform resource locator (URL) referencing an image that can be accessed using the network 102. In some examples, the image reference 138 may be an image signature that can be used to look up an image in a database of images. In some examples, the image reference 138 may be another kind of reference to an image file. In some implementations, multiple labels 136 can be stored in association with a single image reference 138, e.g., when an image can be described with multiple labels, and multiple image references 138 can be stored in association with a single label 136, e.g., when a single label describes more than one image.

When the image label subsystem 126 receives a query image as an input, the image label subsystem 126 can return one or more labels that describe a topic of the query image or are otherwise semantically related to the query image. In some examples, the image label subsystem 126 can identify a label that is semantically related to a query image because the image label subsystem 126 stores data describing the query image, including data indicating which labels 136 are semantically related to the query image.

In some examples, the image label subsystem 126 may not store data for the query image. For example, the image label subsystem 126 may have never received information about the query image. The image label subsystem 126 can still identify a set of the labels 136 that are likely to be semantically related to the query image even if the image label subsystem 126 does not have access to data describing the query image.

In some implementations, the image label subsystem 126 has access to data describing images that are visually similar to or near duplicates of the query image. Labels that are semantically related to a particular image are likely to be semantically related to other images that are visually similar to or near duplicates of the particular image. Thus, the image label subsystem 126 can identify labels for images that are visually similar to or near duplicates of the query image and return the identified labels as labels for the query image.

Figure 1B:
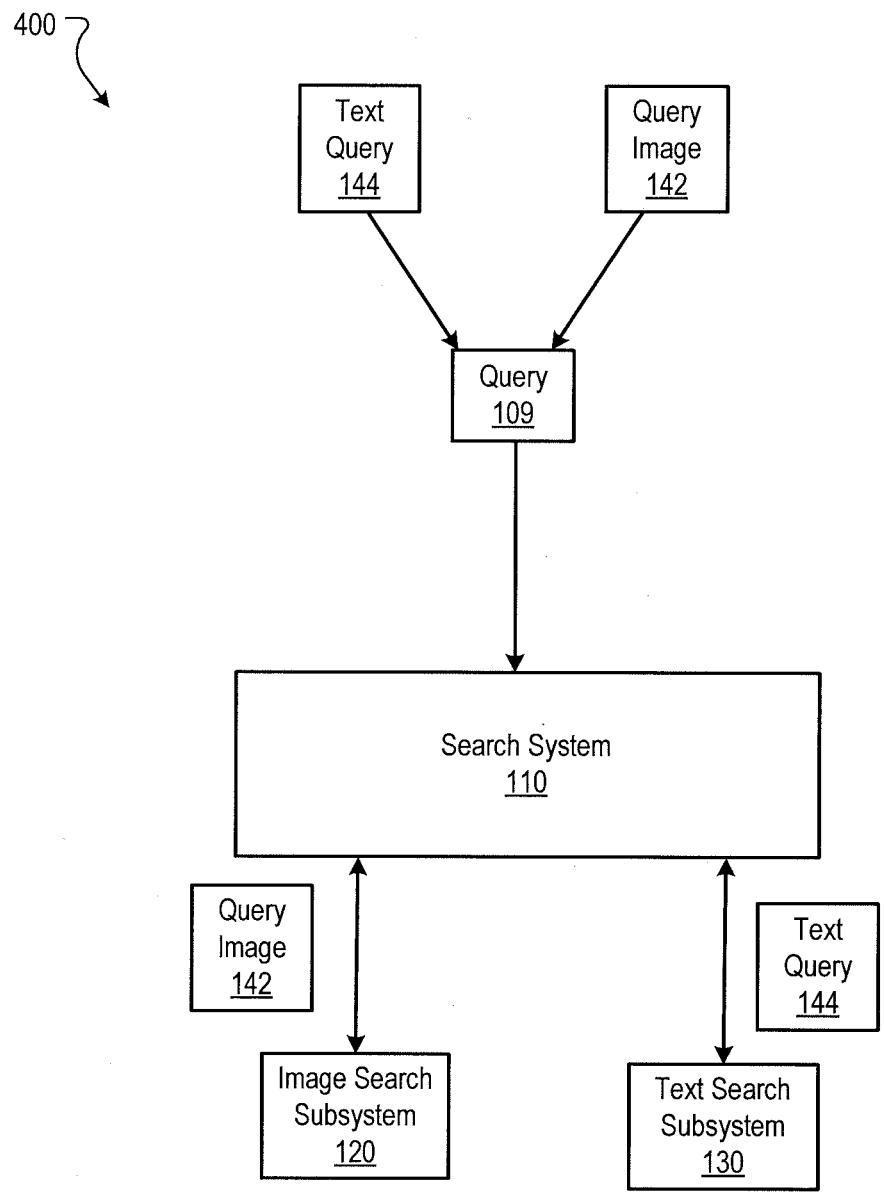
FIG. 1B is a block diagram showing an example of a relationship between the search system and a search query that has both an image portion and a text portion.

FIG. 1B is a block diagram showing an example of a relationship between the search system 110 and a search query 109 that has both an image portion and a text portion. The search query 109 is a hybrid query that has a query image 142 and a text query 144. In some examples, the search query 109 is generated by a user device 106. For example, the query image 142 can be an image transmitted by the user device 106 to the search system 110, or the query image 142 can be an image at a uniform resource locator, URL, that was specified by the user device 106. The text query 144 can be text transmitted by the user device 106 to the search system 110. In some examples, the text query 144 is a label describing the query image 142, e.g., a label specified by the image label subsystem 126.

The text query 144 can also be determined by the search system 110. For example, the query image 142 may have been the sole portion of the search query 109 that was submitted by a user device 106. The search system 110 may have used to be query image 142 to identify a label associated with the query image 142, e.g., using the image label subsystem 126, and subsequently included the label in the search query 109 as a text query 144.

The search system 110 provides the portions of the search query 109 to subsystems appropriate for processing each portion. For example, if the search query 109 includes a query image 142, the query image 142 can be provided to the image search subsystem 120, which returns search results responsive to the query image 142. If the search query includes a text query 144, the text query 144 can be provided to the text search subsystem 130, which returns search results responsive to the text query 144. The responsive search results can be combined and provided, e.g., to the user device 106 that submitted the search query 109.

Figure 2A:
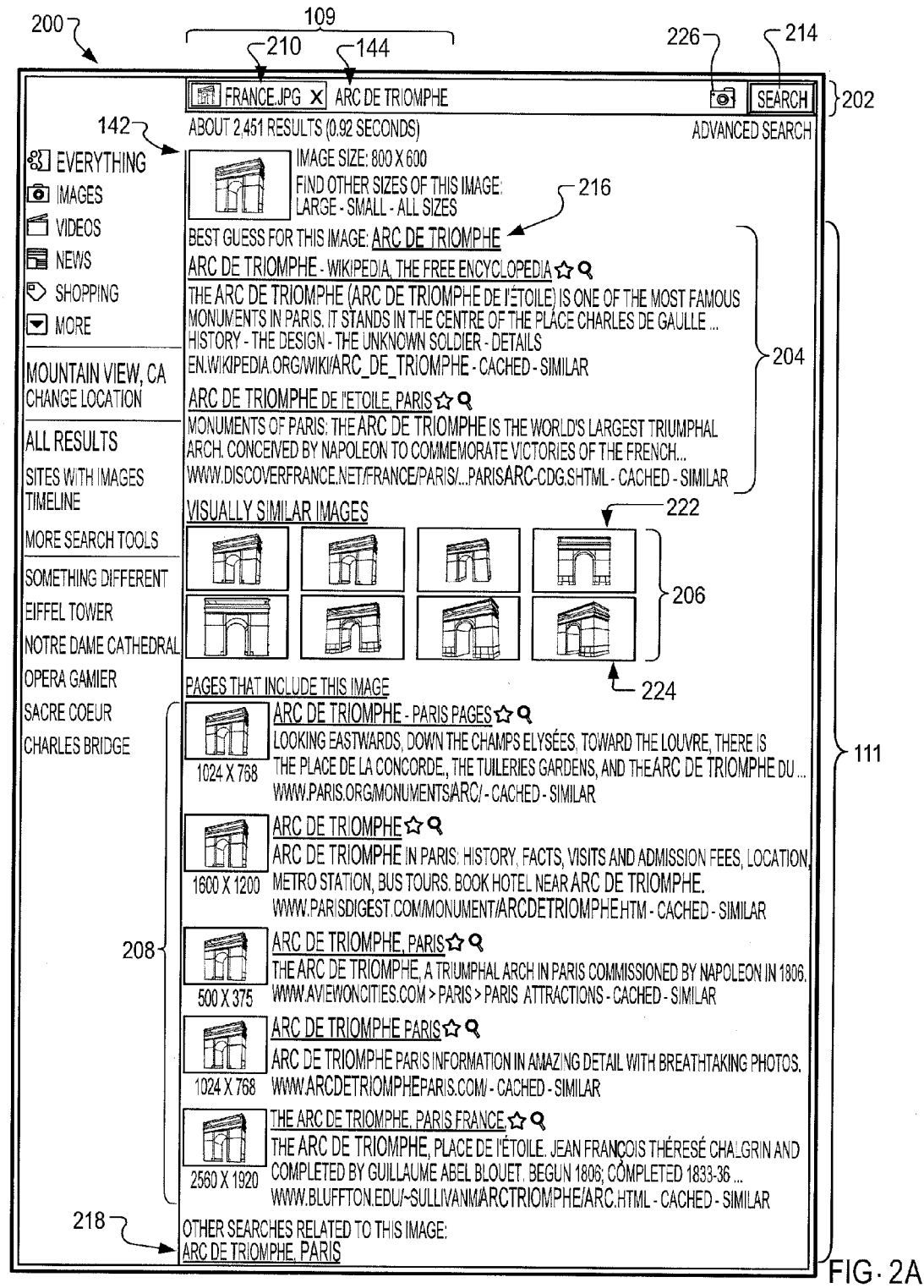
FIG. 2A shows an example of a user interface for displaying search results provided by the search system shown in FIG. 1.

FIG. 2A shows an example of a user interface 200 for displaying search results 111 provided by the search system 110 shown in FIG. 1. The search results are displayed in the form of result-page-blocks, including label search results 204, visually similar images 206, and near duplicate images 208, described below. The user interface 200 can be displayed, for example, on a web browser operating on a user device 106.

The user interface 200 displays a search query box 202 containing the search query 109 to which the displayed search results 111 are responsive. In some examples, the search query 109 can be a hybrid query having an image portion and a text portion, e.g., a query image 142 and a text query 144, respectively, as shown in FIG. 1B. For example, the image portion can represent a query image received by the search system 110 from the user device 106, and the text portion can represent a label associated with the query image, e.g. associated with the query image based on data stored in the image label subsystem 126. In this example, the search results displayed by the user interface 200 are responsive to both the query image represented in the search query box 202 as well as the text represented in the search query box 202. In some examples, the text represented in the search query box 202 is a text query entered by the user of the user interface 200.

In some implementations, the search results displayed in the user interface 200 can include label search results 204 responsive to a label 216 describing the query image 142. For example, the search system 110 can obtain a label 216 that is semantically related to the query image 142, e.g., by accessing an image label subsystem 126 as shown in FIG. 1. For example, a label provided by the image label subsystem 126 may be a "best guess" that has a highest confidence, e.g., a highest score indicating a confidence, that the label is most semantically related to the query image 142.

The label 216 obtained by the search system 110 can then be used to perform a search using the label 216 as a text query 144. The text query 144 is provided for a text-based search, e.g., provided to a text search subsystem 130 as shown in FIG. 1, which returns search results 204 responsive to the text query 144.

In some examples, the image label subsystem 126 also returns alternative labels 218. For example, the alternative labels 218 may be labels that are also semantically related to the query image 142. In some examples, the alternative labels 218 have a lower confidence score than the label 216 used as a text query 144. The alternative labels 218 can be displayed in the user interface 200 as alternatives to the label 216 used as a text query 144. A user can click on one of the alternative labels 218 to initiate a search using a search query 109 that includes the alternative label 218 and the query image 142. Further details about the labels used to obtain the label search results 204 as well as confidence scores of labels are described below with respect to FIG. 7.

In some implementations, the search results displayed in the user interface 200 can include visually similar images 206 to the query image 142. For example, the search system 110 can provide the query image 142 to an image similarity subsystem 124. The image similarity subsystem 124 can then process the query image 142 to identify other images, e.g., other images available on web sites, that are visually similar to the query image 142. Two images are visually similar if they have visually related features. For example, high contrast images are visually related by their high contrast, and sepia tone images are visually related by their use of sepia tones. As described above, two photographs of the same object taken at different angles can also be visually similar images. For example, FIG. 2A shows two images 222, 224 representing two photographs of the same physical object, an arch. Each of the two photographs is taken at a different vantage point than the other but still represents the same physical object and has visual features in common with the other photograph such as the object itself and the background colors in the respective images. The images 222, 224 are visually similar images.

In some implementations, the search results displayed in the user interface 200 can include near duplicate images 208 for the query image 142. For example, the near duplicate images 208 can be displayed with reference to web pages that contain the near duplicate images. As described above, two identical images at different resolutions can be considered near duplicate images. As another example, two identical images having different brightness, contrast, or other image attributes, e.g., image attributes adjusted in image processing software as opposed to visual features of the images, can be near duplicate images. As another example, an uncropped version of an image and a cropped version of the same image, e.g., cropped to remove a border in the image, can be near duplicate images. Further details about identifying near duplicate images are described below with respect to FIGS. 13-15.

In some examples, the image portion of the search query 109 is represented in the search query box 202 by an image icon 210. The image icon 210 contains a thumbnail representation, e.g., a lower resolution version, of the query image 142 of the search query 109. The image icon 210 can be manipulated within the user interface 200. For example, the image icon 210 can be moved within the search query box 202, e.g., dragged by a cursor controlled by an input device, and also be removed from the search query box 202, which also removes the query image 142 from the search query 109. For example, the query image 142 can be removed from the search query 109 and subsequently re-submitted by the user device 106 to the search system 110, e.g., by clicking a search button 214 in the user interface 200. Because the image icon 210 is compact and fits within the search query box 202, the search query 109 can be displayed as a single unit within the search query box 202 including both the image icon 210 and the text query 144. In this way, non-textual elements can be displayed in a representation of a search query 109 alongside textual elements, such as a text query 144. A user of the user interface 200 can add an additional image icon 210 representing a query image to the search query box 202 by clicking on a camera icon 226. A click of the camera icon 226 directs a user to a query interface for providing a query image, described in further detail below with respect to FIG. 3.

Figure 2B:
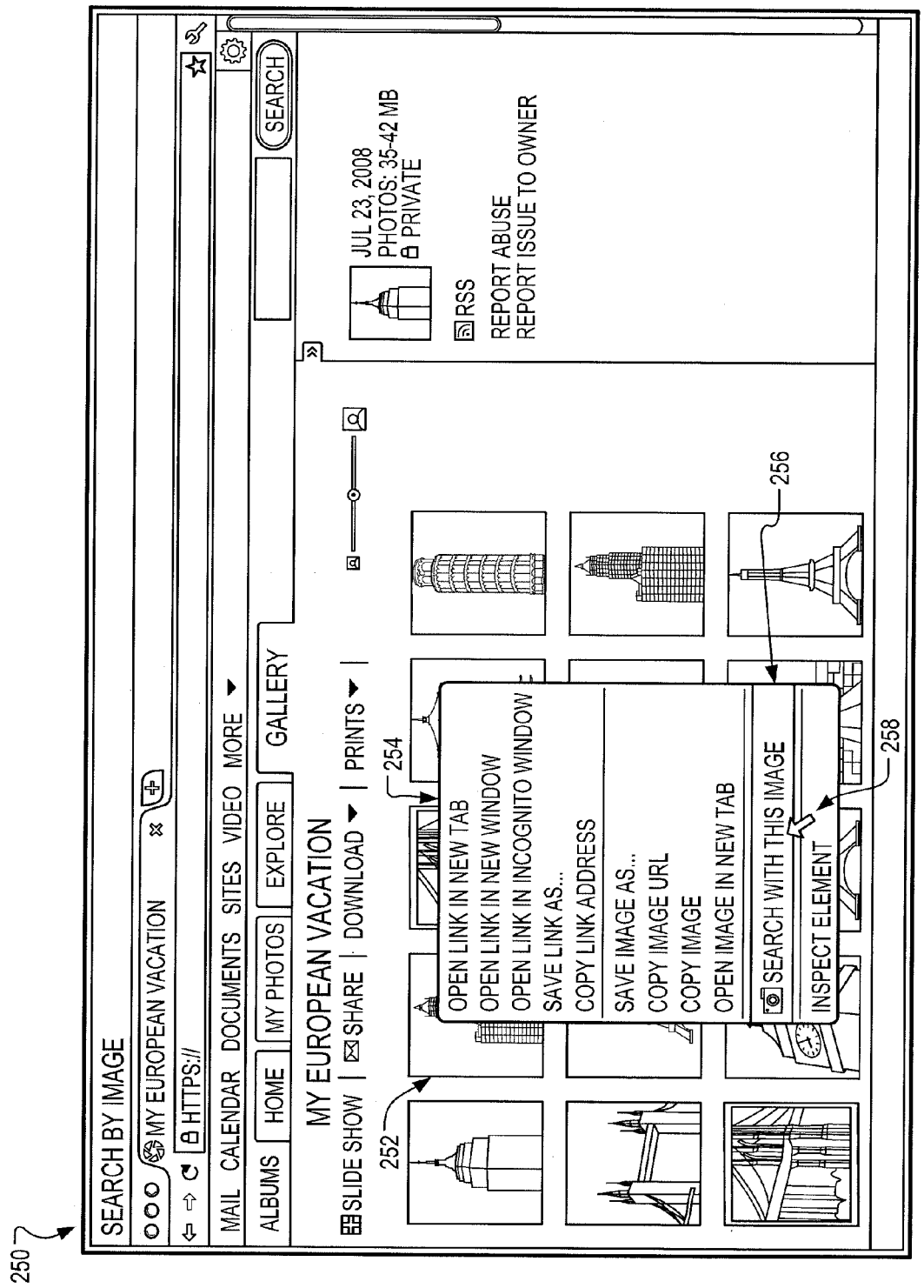
FIG. 2B shows an example of a web browser interface.

FIG. 2B shows an example of a web browser interface 250. The web browser interface 250 allows a user to select any image displayed in a web browser, e.g., displayed on a user device 106, to be used as a query image 142. In one example of a user's interaction with the web browser interface 250, a user can right-click, e.g., on an input device such as a mouse or a trackpad, on an image 252 displayed in the web browser interface 250. For example, the image 252 may be displayed within a web page shown in the web browser interface 250. The action of the right-click causes the web browser interface 250 to display a contextual menu 254 including a menu option 256 that allows the user to choose this image 252 as a query image 142. The user can choose the menu option 256, for example, with an input device cursor 258. In some implementations, in response, the image 252 may then be displayed, for example, as an image icon 210 representing a query image in a user interface 200, as shown in FIG. 2A. In some implementations, once the image 252 is chosen in the web browser interface 250 as a query image 142, the image 252 may be subsequently submitted, e.g., by the web browser interface 250 or by another system operating on the user device 106, to a search system 110, FIG. 1A, and a search is then performed using the image 252 as a query image 142, e.g., a query image 142 within a search query 109. The image 252 could be any image viewed in a web browser and there is generally no restriction on which image 252 can be chosen or from which web pages the image 252 can be chosen. In some implementations, the contextual menu 254 is provided by add-on software operating on a user device 106, for example, a web browser extension.

Figure 3:
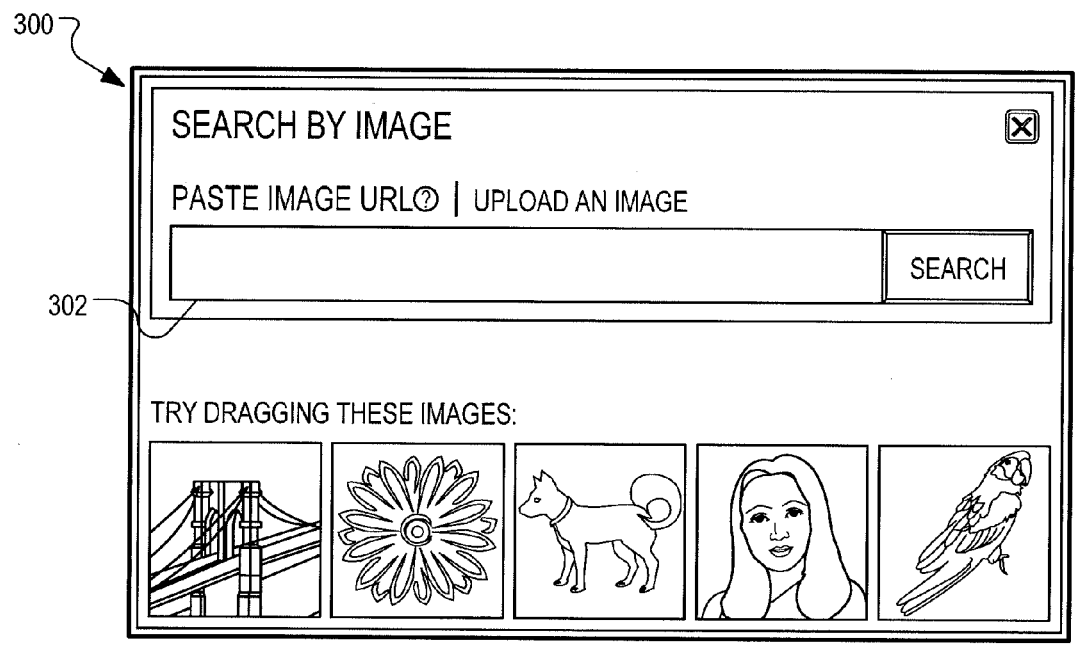
FIG. 3 shows an example of a query interface for providing a query image.

FIG. 3 shows an example of a query interface 300 for providing a query image. For example, the query interface 300 can be used on a user device 106 to supply a query image 142 as a portion of a search query 109 submitted to a search system 110, e.g., as shown in FIGS. 1A-1B. The query interface 300 can be used to enter a uniform resource locator (URL) in a URL box 302. In some examples, a URL entered in the URL box 302 is submitted by a user device 106 to a search system 110 as a portion of a search query 109. The search system 110 can then obtain an image referenced by the URL. In some examples, the query interface 300 operates on a user device 106 which obtains the image referenced by the URL. The user device 106 on which the query interface 300 operates then submits the image referenced by the URL to the search system 110 as a portion of a search query 109.

Figure 4:
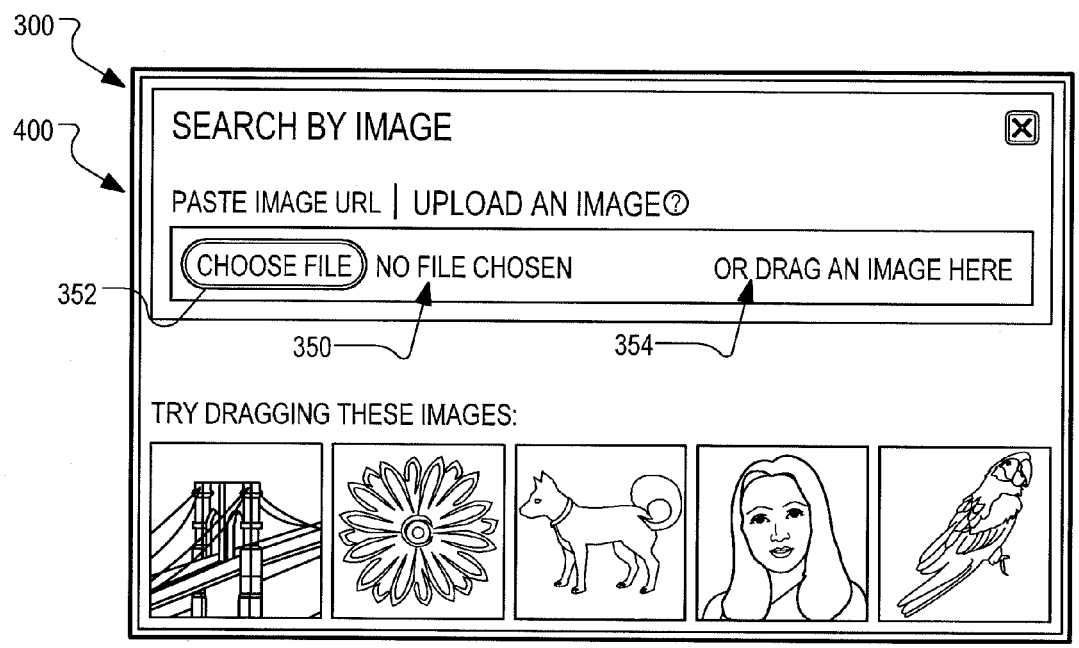
FIG. 4 shows another view of the query interface for providing a query image.

FIG. 4 shows another view 400 of the query interface 300 for providing a query image. The query interface 300 has an image selection box 350 that can be used to provide a query image to the query interface 300, e.g. to be submitted to a search system 110. For example, the image selection box 350 can be used to identify an image file that is resident in a data storage system of the user device 106 or otherwise available to the user device 106 on which the query interface 300 is displayed. In some implementations, the image selection box 350 has a "choose file" button 352 that presents a user interface for navigating a file system of the user device 106 to identify the image to be submitted to the search system 110. In some implementations, the image selection box 350 has an image file dragging area 354. An image file, e.g., represented by an icon in a user interface of a user device 106, can be dragged to the image file dragging area 354 to indicate that the image file is to be submitted to the search system 110.

Figure 5:
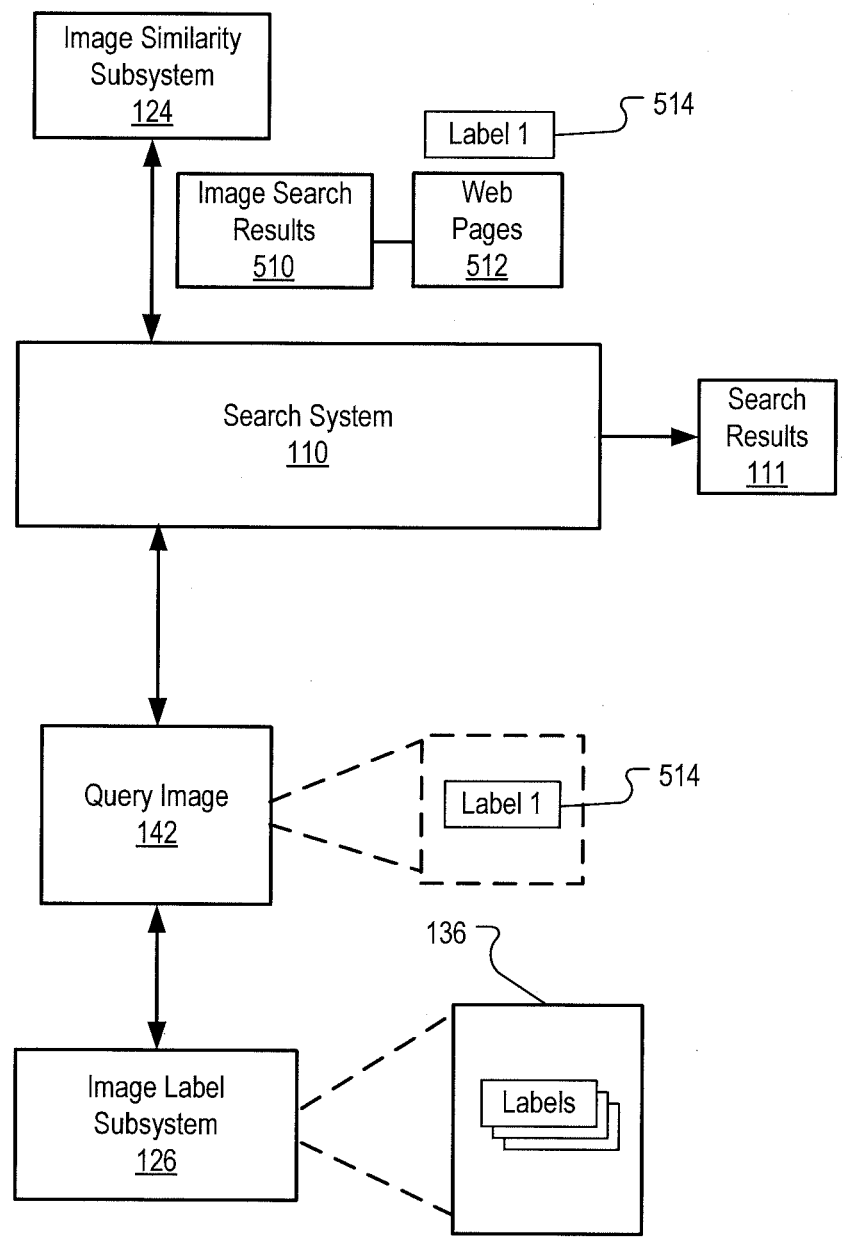
FIG. 5 is a block diagram of portions of the search system and related components.

FIG. 5 is a block diagram of portions of the search system 110 and related components. As described above with respect to FIG. 2A, the search system 110 can present near duplicate images 208 responsive to a query image 142 in the form of web pages containing the near duplicate images. As described below, the search system 110 can also order the near duplicate images based on information available to the search system 110 about the images and about the web pages containing the images.

When the search system 110 receives a query image 142, the search system 110 provides the query image 142 to the image similarity subsystem 124. The image similarity subsystem 124 returns image search results 510 in the form of references to images that are near duplicates of the query image 142. The image search results 510 may also include references to web pages 512 containing the respective near duplicate images. For example, the image similarity subsystem 124 may store images in association with references to web pages, e.g., stored in an image data store 132 accessible by the image similarity subsystem 124.

The search system 110 also provides the query image 142 to the image label subsystem 126. The image label subsystem 126 contains labels 136 that have been identified as semantically related to images or otherwise describe topics to which images belong. The image label subsystem 126 returns a label 514 that is semantically related to the query image 142.

In some examples, the image label subsystem 126 does not contain a label 514 that is semantically related to the query image 142 to a degree of confidence acceptable to the search system 110. In these examples, the search system 110 may obtain a text query from a user and use the text query in place of a label. These scenarios are described in detail in FIG. 8.

The search system 110 can order the web pages 512 referenced by the image search results 510 according to characteristics of the web pages 512. For example, the search system 110 can order the image search results 510 based on which web pages 512 contain the label 514 associated with the query image 142. The search system can also order the image search results 510 based on a search result score associated with each of the web pages 512. The search system 110 can also order the image search results 510 based on other factors. The re-ordered image search results 510 can be provided as a portion of search results 111 returned by the search system 110, e.g., returned to a user device 106 in response to a search query 109.

Figure 6:
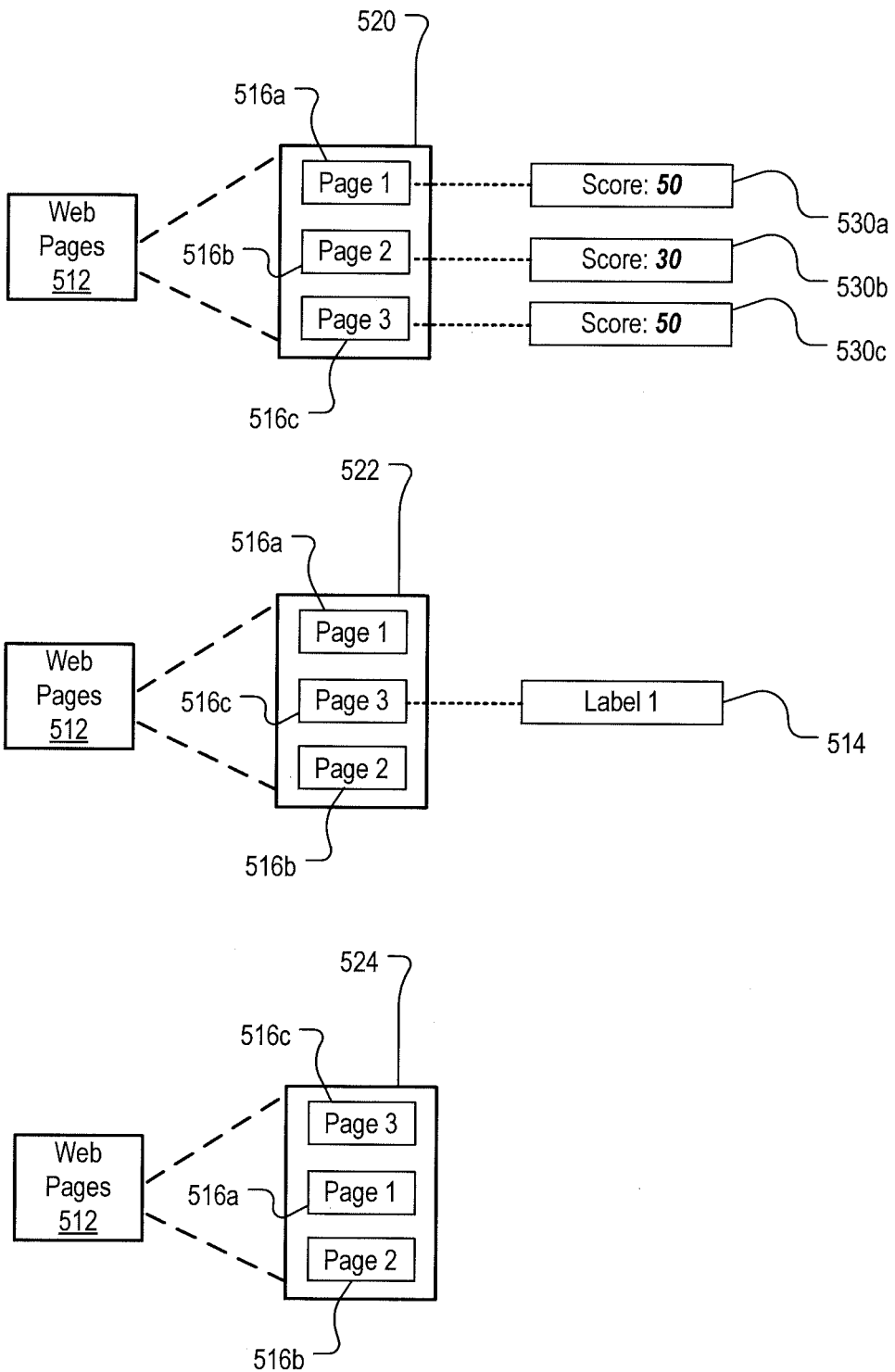
FIG. 6 shows a block diagram of references to web pages being re-ordered by the search system.

FIG. 6 shows a block diagram of references to web pages 512 being re-ordered by the search system 110. The references to web pages 512 are re-ordered for display based on their respective responsiveness to a query image 142, as shown in FIG. 5. For example, the web pages 512 each may contain an image responsive to the query image 142.

In some examples, references to web pages 512 are each stored in association with a search result score. A search result score is a metric that represents relevance of a resource, e.g., one of the web pages 512, to a search query. For example, a search result score for a resource can be computed based on an information retrieval ("IR") score corresponding to the resource, and, optionally, a quality score of the resource relative to other available resources. A search result, e.g., a reference to a web page, with a higher search result score is more likely to be relevant to a viewer. In this example, the references to web pages 512 include three web pages 516a-c each associated with a search result score 530a-c. Two of the web pages 516a, 516c each have a quality score 530a, 530c of "50" while one of the web pages 516b has a search result score 530b of "30." Initially, the web pages 516a-c may have an arrangement 520 in an arbitrary or random manner unrelated to an order suited for presentation to a user. For example, the web pages 516a-c may be arranged in an order in which they are stored in a database maintained by the search system 110 or one of its subsystems.

The search system 110 can re-order the references to web pages 512 to an order suited for presentation to a user. For example, the search system 110 can order the web pages 516a-c according to their respective search result scores 530a-c. In a re-ordered arrangement 522 shown in FIG. 6, the search system 110 has re-ordered the web pages 516a-c so that the web pages 516a, 516c having higher search result scores 530a, 530c, "50", appear above the web page 516b having a lower search result score 530b, "30". When the references to web pages 512 appear in search results, the higher-scoring web pages will appear first and may be more relevant to a user viewing the search results, e.g., viewing search results returned to a user device 106.

The search system 110 can also re-order the references to web pages 512 based on whether a label 514 appears in any of the web pages. The label 514 is semantically related to a query image 142 that appears in each of the web pages 516a-c. If any of the web pages 516a-c also includes text that corresponds to the label 514, then that web page may be more relevant to a user who has submitted a search query that includes the query image 142. Accordingly, the search system 110 can re-order the web pages 516a-c so that web pages containing the label 514 appear above some or all of the web pages not containing the label. In a second re-ordered arrangement 524 shown in FIG. 6, the search system 110 has re-ordered the web pages 516a-c so that the web page 516c containing the label 514 within its text is placed above web pages 516a, 516b not containing the label 514, even though the web page 516c containing the label 514 has the same search result score, "50", as a web page 516a not containing the label 514.

In some implementations, the search system 110 assigns a score to each of the references to web pages 512 and orders the references to web pages 512 based on the assigned score. For example, search system 110 may assign a score to each of the web pages 516a-c based on whether a label 514 appears in any of the web pages and based on the search result scores 530a-c associated with the respective web page. The search system 110 may assign a higher score to a web page in which a label appears, and the search system 110 may assign a higher score to a web page having a higher search result score, e.g., a search result score above a threshold, than a web page having a lower search result score.

In some examples, the label 514 is a label returned by the image label subsystem 126 of the search system 110. In some examples, the label 514 need not be a label returned by the image label subsystem 126. For example, the label 514 can be a text query 144 submitted by a user device 106 as a portion of a search query 109, as shown in FIG. 1B. In this example, the text query 144 corresponding to the label 514 has been entered by a user. The web pages 516a-c containing the text query 144 may be more relevant to the user, e.g., of greater interest to the user, since the user himself has included the text of the text query 144 in the search query 109.

Figure 7:
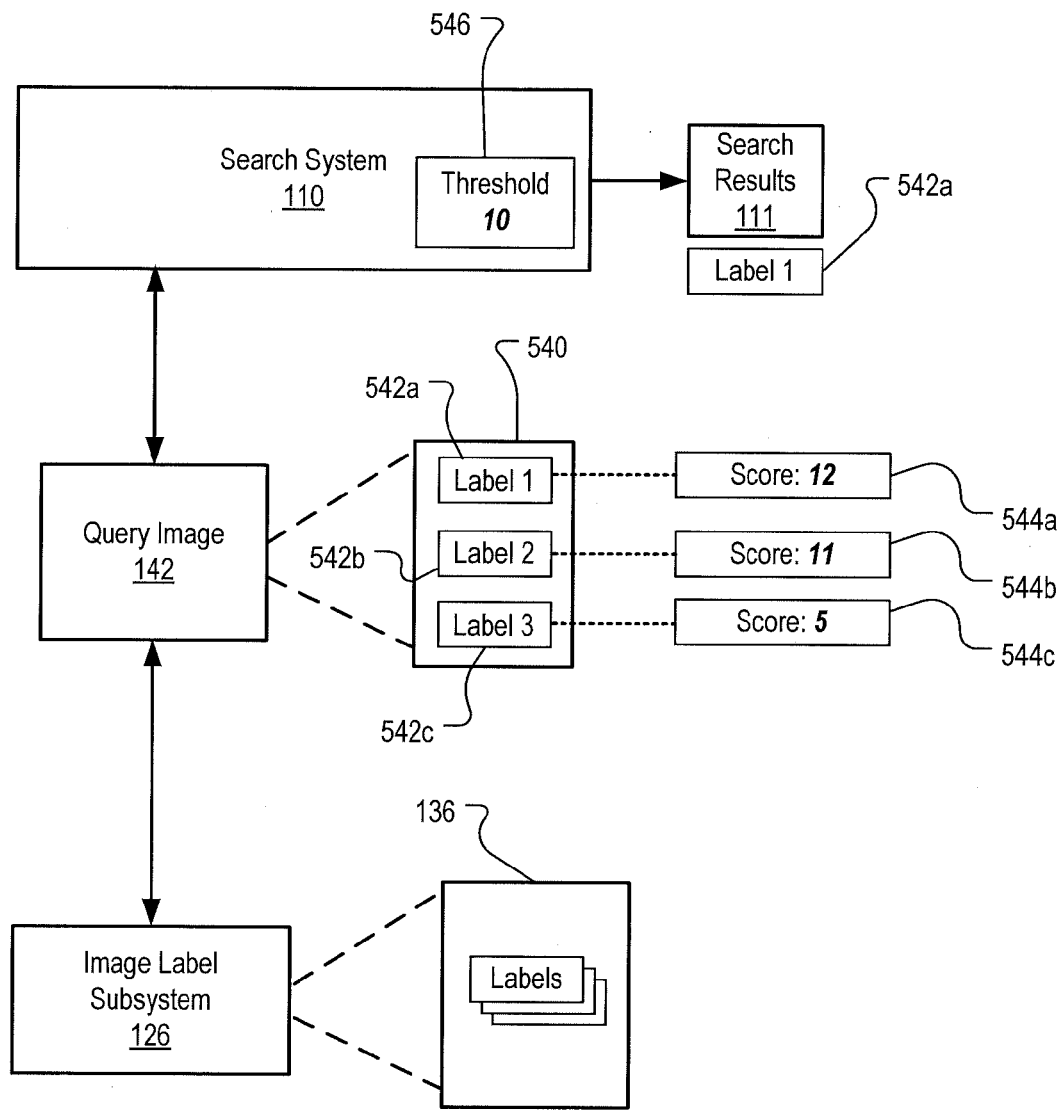
FIG. 7 is another block diagram of portions of the search system and related components.

FIG. 7 is a block diagram of portions of the search system 110 and related components. As described above with respect to FIG. 2A, the search system 110 returns label search results 204 that indicate web pages responsive to a search performed using a label 216 as a search query. The label 216 describes a topic to which the query image 142 belongs and/or to which the query image 142 is semantically related. Further, the user interface 200 can also display alternative labels 218 that a user may submit as search queries for subsequent searches.

As shown in FIG. 7, the search system 110 can obtain labels 542a-c from the image label subsystem 126. In this example, the labels 542a-c are semantically related to a query image 142. Further, each of the labels 542a-c can be associated with a confidence score 544a-c. A confidence score indicates the degree to which the associated label is likely to be semantically related to the image with which the label is associated. Some labels may have a high confidence score, indicating it is very likely that the label accurately describes the associated image. Some labels may have a low confidence score, indicating it is less likely that the label accurately describes the associated image. The demarcation between a high confidence score and a low confidence score can be indicated by a confidence score threshold 546.

Over time, a confidence score of a label can be adjusted upward or downward as the image label subsystem 126 obtains information about whether a label accurately describes an associated image. The information obtained by the image label subsystem 126 about whether a label accurately describes an associated image may include, for example, explicit user feedback such as a user rating of the accuracy of the label, and implicit user feedback such as the way in which a user interacts with a label and its associated image. In some implementations, a default confidence score may first be assigned to a label, and the confidence score is adjusted over time.

The search system 110 submits the query image 142 to the image label subsystem 126, which stores or receives labels 136 that are semantically related to images. The image label subsystem 126 returns labels 542a-c and also returns confidence scores 544a-c associated with the respective labels. The search system 110 uses the confidence scores 544a-c to select a label from among the labels 542a-c returned. The search system 110 is configured with a confidence score threshold 546 indicating a lowest confidence score which the search system 110 will accept for a label in order to use the label in determining search results responsive to the query image 142. In the example shown in FIG. 7, two of the labels 542a, 542b have confidence scores 544a, 544b of "12" and "11," respectively. These confidence scores 544a, 544b exceed the confidence score threshold 546, which is "10." Thus, the associated labels 542a, 542b can be deemed to be semantically related to the query image 142, such that the search system 110 can use labels 542a and 542b to identify search results that are responsive to the query image 142.

Because two of the labels 542a, 542b have confidence scores 544a, 544b that exceed the confidence score threshold 546, the search system 110 can select one, or more, of the labels 542a, 542b to use in performing a search responsive to the query image 142. For example, the search system 110 can select the label 542a having the higher confidence score 544a, indicating that the label 542a is the most semantically related label for the query image 142, and therefore, most likely to return search results responsive to the query image 142.

The other label 542b can be presented as an alternative to the label 542a used by the search system 110. For example, the other label 542b can be presented as an alternative label 218 displayed in a user interface 200 as alternatives to a label 216, e.g., label 542a, used as a text query 144, as shown in FIG. 2A. Therefore, the user can click on, or otherwise interact with, one of the alternative labels in the user interface 200 to perform a new search using the clicked label.

In some scenarios, none of the labels returned by the image label subsystem 126 exceed the confidence score threshold 546. These scenarios are described in greater detail below with respect to FIG. 8.

Figure 8:
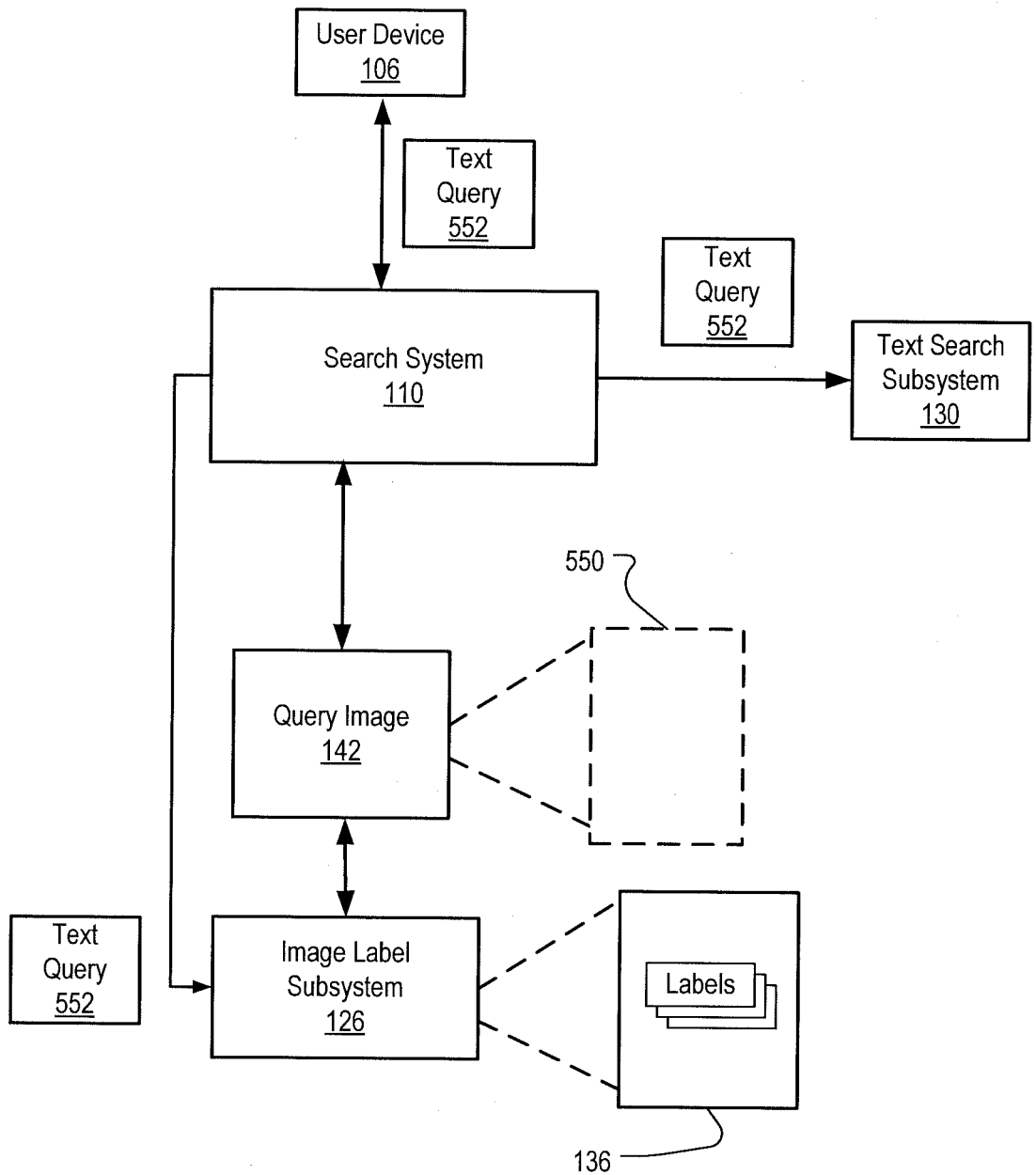
FIG. 8 is another block diagram of portions of the search system and related components.

FIG. 8 is a block diagram of portions of the search system 110 and related components. As described above with respect to FIG. 2A, the search system 110 returns label search results 204 that indicate web pages responsive to a search performed using a label 216 as a search query. The label 216 specifies a topic to which the query image 142 belongs and/or to which the query image 142 is semantically related. If the search system 110 cannot identify the label 216, the user interface 200 can prompt a user to enter in a text query, e.g., text query 144. The search system 110 then records the text query 144 as a label for the query image 142 in a label database.

As shown in FIG. 8, the search system 110 provides a query image 142 to the image label subsystem 126 to obtain labels that are semantically related to the query image 142. In some scenarios, none of the labels 136 available to the image label subsystem 126 are semantically related to the query image 142 in a manner that is acceptable to the search system 110. For example, the image label subsystem 126 may be unable to identify any of its labels 136 as being associated with or relevant to the query image 142, such that no labels are returned. For example, the image label subsystem 126 may only return labels that have confidence scores below a confidence score threshold, as described above with respect to FIG. 7. Thus, the query image may have a null set of semantically related labels.

In some implementations, the search system 110 does not provide a query image 142 to the image label subsystem 126, such that no label is returned by the image label subsystem 126. For example, the search system 110 may have received a text query at the same time as it received the query image, e.g., as portions of a hybrid query. In this example, the search system 110 may opt to obtain search results based on the text query and opt out of obtaining a label from the image label subsystem 126. Thus, in some implementations, a text query can be used in place of a label.

If the search system 110 has been provided with an indication 550 that no labels are semantically related to the query image 142, e.g., in a manner that is acceptable to the search system 110, or otherwise determines that no labels will be received for the query image 142, the search system 110 can prompt a user of a user device 106, e.g., through a user interface 200 as shown in FIG. 2A, to indicate a text query 552. The text query 552 can then be provided by the user device 106 to the search system 110. For example, if the search system 110 has not identified a label describing a query image 142 depicting a mackerel, a user can enter a text query 552 such as the words "mackerel fish" to perform a search. In some implementations, the search system 110 may have already received a text query 552 at the same time as the query image 142, and so the search system 110 need not prompt a user for the text query 552 since the search system 110 can use the text query 552 to perform the search.

The search system 110 can perform a search, e.g., by providing the text query 552 to a text search subsystem 130. Search results responsive to the text query 552 can be returned to the user device 106 in place of search results responsive to a label describing the query image 142.

The search system 110 can also use the text query 552 as a label for the query image 142. Because the text query 552 is submitted as a follow-up query subsequent to submitting the query image 142, the text query 552 is likely to have the same topic as the query image 142, and thus, is likely to be semantically related to the query image 142. The search system 110 can provide the text query 552 to the image label subsystem 126 and indicate that the image label subsystem 126 should store the text query 552 as a label in association with the query image 142. In some implementations, the text query 552 can be assigned a confidence score, for example, a default confidence score assigned to text queries stored as labels. This confidence score can then be used as an indication of whether the label is considered semantically related to the image.

Figure 9:
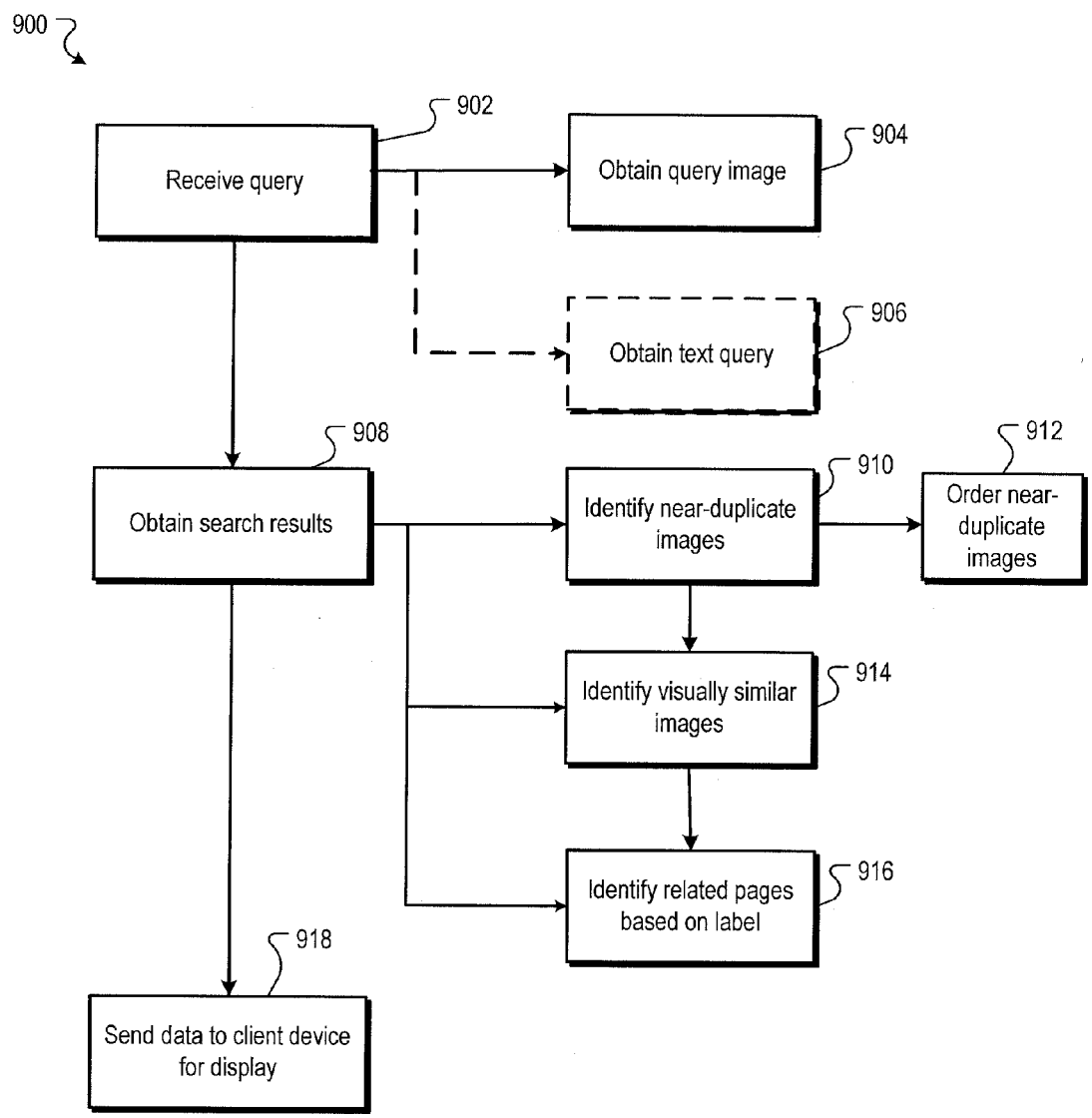
FIG. 9 shows a flowchart showing example operations for processing a search query.

FIG. 9 shows a flow chart 900 showing example operations for processing a search query. The operations depicted by the flow chart 900 can be performed, for example, by a portion of the search system 110 shown in FIG. 1A, e.g., the image search subsystem 120 and the text search subsystem 130. The operations can be used to process a search query 109 containing a query image 142 and, optionally, a text query 144. The subsystems, e.g., the image search subsystem 120 or the text search subsystem 130, are used in several of the examples below, but other systems may perform some or all of the operations described.

The subsystems receive a search query, e.g., from a user device, 902. The search query may contain a query image and may optionally contain a text query. The image search subsystem obtains the query image portion of the search query, 904. If the search query contains a text query portion, the text search subsystem obtains the text query portion of the search query, 906. In some examples, the query image and the text query may be processed by the same or different subsystems.

The subsystems use the portions of the search query to obtain search results, 908. As described above, obtaining search results can include multiple operations that may be carried out sequentially or in parallel. The image search subsystem identifies images that are near-duplicates of the query image, 910. For example, the image search subsystem can provide the query image to an image similarity subsystem which identifies images that are near duplicates. The image search subsystem may also order the results returned by the image similarity subsystem, 912. For example, the image search subsystem may order the results in a manner similar to that described with reference to FIG. 10.

The image search subsystem also identifies images that are visually similar to the query image, 914. For example, the image similarity subsystem may also identify visually similar images. The image search subsystem identifies pages that are related to the query image based on a label associated with the query image, 916. For example, the label may be obtained from the image label subsystem as described above. The subsystems perform a text-based search, e.g., using a text search subsystem, using the label as a text query. In some examples, the text query obtained in operation 906 is used to obtain search results from the text search subsystem.

Once the search results have been obtained, data representing the search results are sent to a client device for display, e.g., sent to user device 106 shown in FIG. 1A, 918. Execution of the data can cause the search results to be displayed on a user interface such as a web page, e.g., the user interface 200 shown in FIG. 2A.

Figure 10:
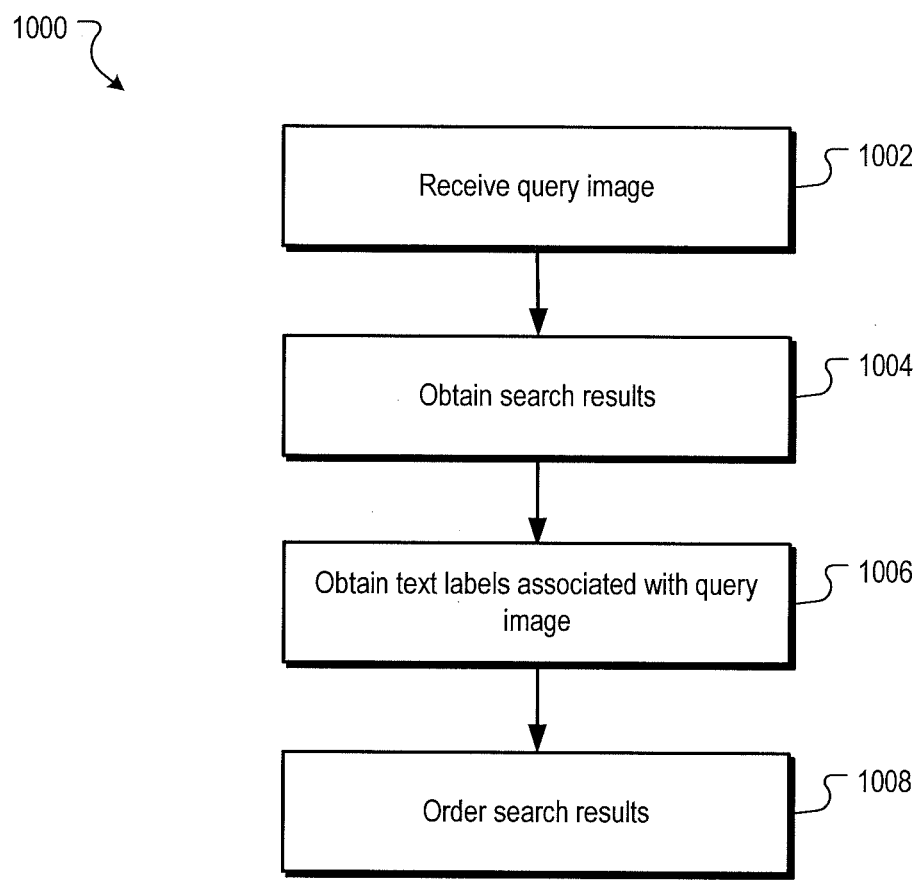
FIG. 10 shows a flowchart showing example operations for processing near-duplicate images.

FIG. 10 shows a flowchart 1000 showing example operations for processing near-duplicate images. The operations of the flowchart 1000 can be performed, for example, by an image search subsystem 120, FIG. 1A, to order images that are near-duplicates of a query image in preparation for display on a user interface 200, FIG. 2A.

The image search subsystem receives a query image, 1002. For example, the query image can be received as part of a search query, as shown in operations 902 and 904 of FIG. 9. The image search subsystem obtains search results responsive to the query image, 1004. Each of the search results may identify a corresponding web page containing an image that is determined to be responsive to the query image. For example, each web page may contain an image that is a near duplicate of the query image. The image search subsystem obtains text labels associated with the query image, 1006. For example, the text labels may be obtained from a database of text labels associated with images, such as an image label subsystem. The image search subsystem then orders the search results, 1008. For example, as described with reference to FIG. 6, the search results can be ordered based on the presence in the corresponding web pages of one or more of the text labels associated with the query image. In some implementations, the search results are ordered based on a score assigned to web pages represented in the search results. For example, the search results may be ordered based on a search result score assigned to the web pages, or the search results may be ordered based on a score assigned to the web pages which combines information about search result scores and labels appearing in the web pages, or the search results may be ordered based on another kind of score. Data representing the ordered search results can then be sent to a client device for display, e.g., as a portion of operation 918 shown in FIG. 9. Alternatively, data specifying the order of the search results can be provided to another data processing apparatus.

Figure 11:
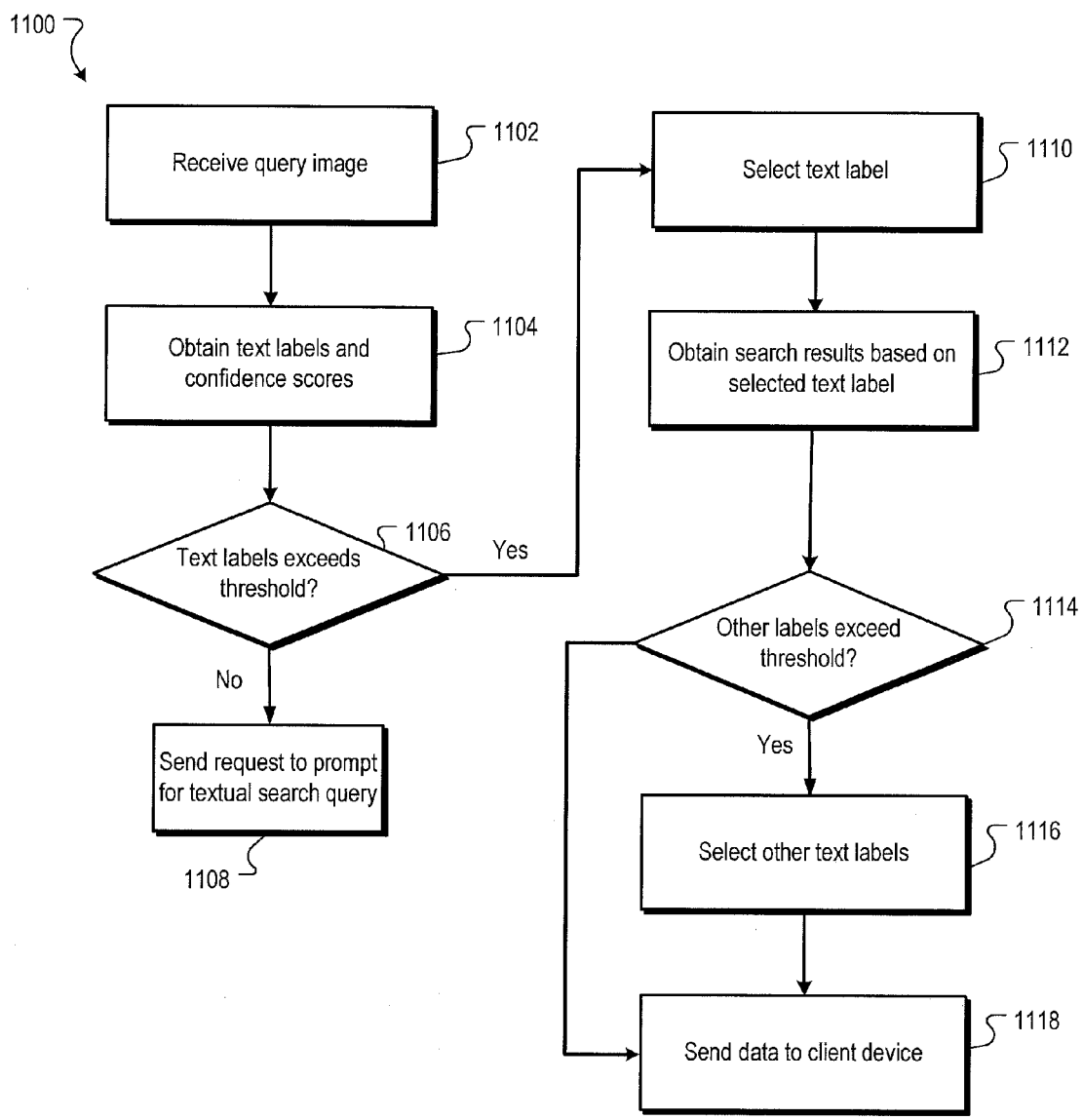
FIG. 11 shows a flowchart showing example operations for preparing search results for display based on confidence scores of labels describing a query image.

FIG. 11 shows a flowchart 1100 showing example operations for preparing search results for display based on confidence scores of labels describing a query image. The operations of the flowchart 1100 can be performed, for example, by an image search subsystem 120, FIG. 1A, in association with operation 916 shown in FIG. 9. The image search subsystem 120 may obtain labels associated with a query image and use some of those labels in further operations based on a confidence score associated with each of the labels.

The image search subsystem receives a query image, 1102. For example, the query image can be received as part of a search query, as shown in operations 902 and 904 of FIG. 9. The image search subsystem obtains text labels associated with the query image and confidence scores associated with the text labels, 1104. For example, as described above with reference to FIG. 7, the labels associated with the query image can be obtained from a database of text labels associated with images, such as an image label subsystem. The confidence score is a measure of confidence that the text label accurately describes a topic of the image or is otherwise semantically related to the image.

The image search subsystem determines if any of the obtained text labels have a confidence score that exceeds a confidence score threshold, e.g., a minimum acceptable confidence score, 1106. If none of the text labels have a confidence score that exceeds a confidence score threshold, the image search subsystem, e.g., in association with a search system, may send a request to prompt a user for a text query and carry out operations described in FIG. 12, 1108.

If at least one of the obtained text labels has a confidence score that exceeds a confidence score threshold, e.g., is considered a semantically related label, the image search subsystem selects at least one of the text labels for use as a search query, 1110. For example, the selected text label may have a highest confidence score among the set of text labels associated with the query image and obtained from the database of text labels. The image search subsystem then obtains search results based on the selected text label, 1112. For example, as described above with reference to FIG. 5, the image search subsystem may provide the text label to a text search subsystem, which provides search results each identify a corresponding web page that includes an image that is determined to be responsive to the query image based on the text label.

The image search subsystem determines if other labels obtained from the database of text labels have a confidence score exceeding a confidence score threshold, 1114. For example, a subset, one or more, of the labels obtained from the database of text labels may have a confidence score exceeding a confidence score threshold. If no other labels meet this criteria, then the data representing the search results is sent to a client device for display, 1118, e.g., as a portion of operation 918 shown in FIG. 9. If other labels do have a confidence score exceeding a confidence score threshold, then the image search subsystem can select that subset of labels to be provided for display, 1116. The subset of labels is sent along with the search results to a client device for display in operation 1118. For example, the search results and the other labels may be displayed in a user interface 200 as shown in FIG. 2A. Data representing the other labels may also be provided to another data processing apparatus.

Figure 12:
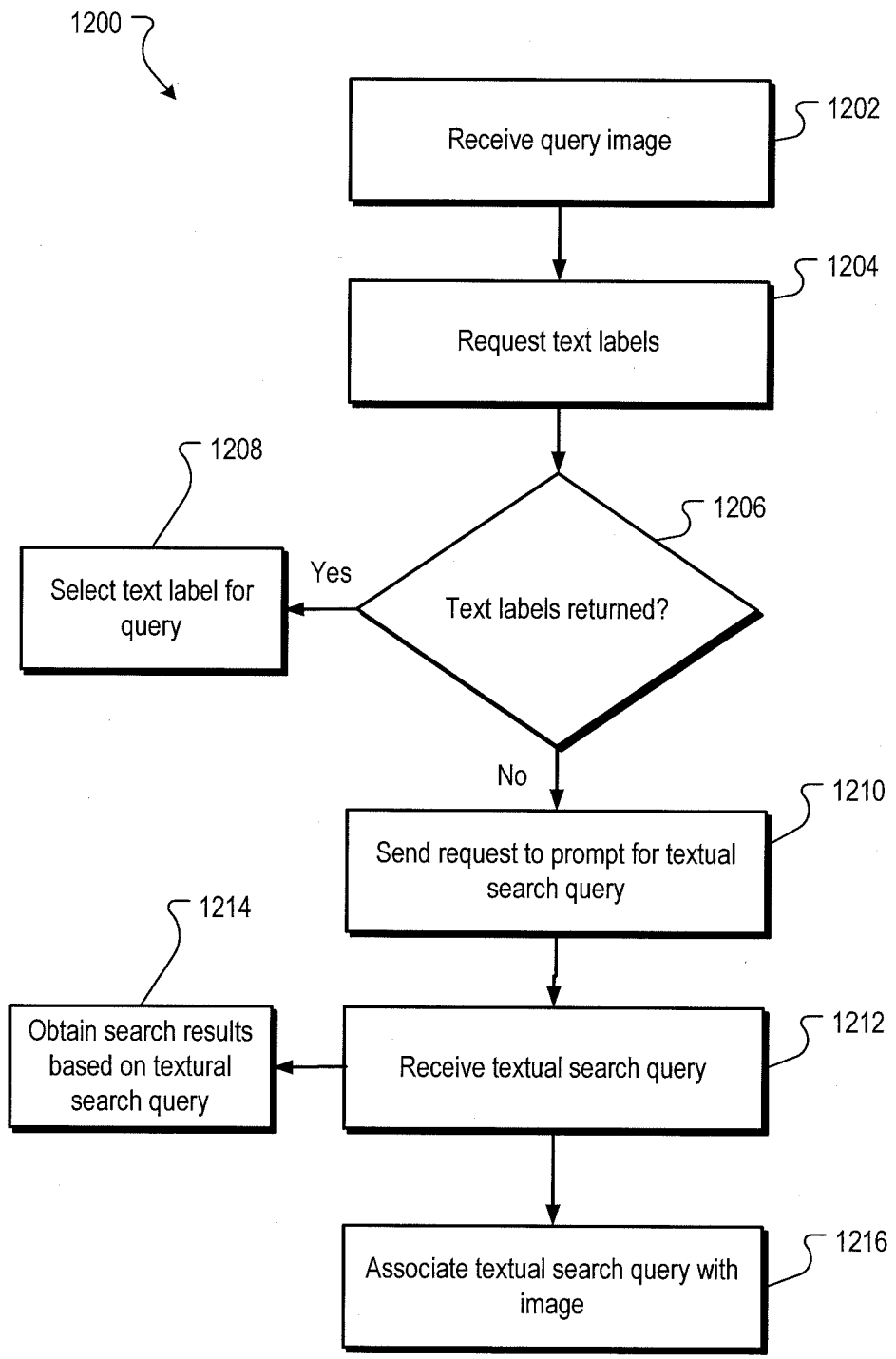
FIG. 12 shows a flowchart showing example operations for associating a text query with an image.

FIG. 12 shows a flowchart 1200 showing example operations for associating a text query with an image. In some implementations, the text query can be associated with an image in a database of text labels. The operations of the flowchart 1200 can be performed, for example, by an image search subsystem 120, FIG. 1A.

The image search subsystem receives a query image, 1202. For example, the query image can be received as part of a search query, as shown in operations 902 and 904 of FIG. 9. The image search subsystem requests text labels associated with the query image, 1204. The text labels can be requested, for example, from a database of text labels associated with images, such as a label data store, e.g., label data store 134 shown in FIG. 1A, storing text labels that are semantically related to images. The image search subsystem determines if the database of text labels has returned text labels that are semantically related to the query image, 1206. If the database of text labels has returned text labels that are semantically related to the query image, then the image search subsystem can select one of the text labels for a subsequent query, 1208, for example, as a portion of operation 916 shown in FIG. 9.

If the database of text labels has not returned text labels that are considered semantically related to the query image, e.g., in a manner that is acceptable to the image search subsystem, then a request can be sent to prompt a user of a user device, e.g., user device 106 shown in FIG. 1A, to enter a textual search query, 1210. A textual search query is received from the user device in response to the request, 1212. At least two operations can be performed, either in parallel or subsequent to one another, responsive to receiving the textual search query.

In the first operation responsive to receiving the textual search query, the subsystems can obtain search results based on the textual search query, 1214. For example, the textual search query can be provided to a text search subsystem, e.g., as a portion of operation 916 shown in FIG. 9. In the second operation responsive to receiving the textual search query, the image search subsystem can associate the textual search query with the query image in the database of text labels associated with images, 1216. For example, the image search subsystem can provide the textual search query to the image label subsystem 126, FIG. 1A, which can associate the textual search query with the query image as a label that is semantically related to the query image.

The image similarity subsystem 124 shown in FIG. 1A can store image signatures 148, which are elements of data representing images in a database maintained by the image similarity subsystem 124, e.g., maintained in the image data store 132. The use of image signatures allows for lookup and retrieval of image data. A signature can be computed for an image, and the database can be consulted to determine if the signature is resident in the database, and/or whether information is stored in the database in association with the signature.

Figure 13:
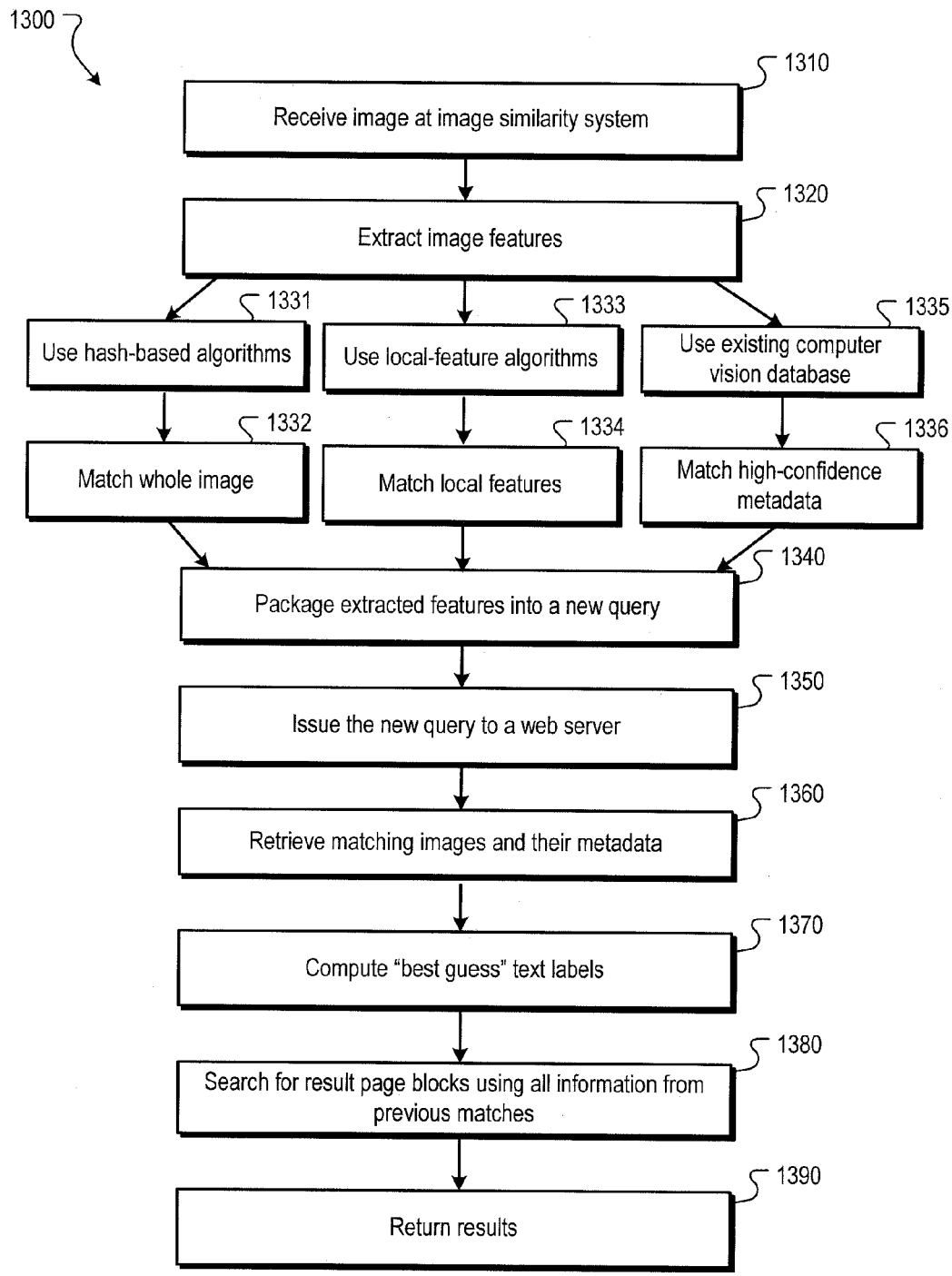
FIG. 13 shows a flowchart of example operations for using an image similarity subsystem.

FIG. 13 shows a flowchart 1300 of example operations for identifying labels that are semantically related to an image. The operations can be carried out, for example, by the image similarity subsystem 124 of FIG. 1A to search for images that are visually similar or near duplicates of a query image 142. For example, the image similarity subsystem 124 can perform the operations of the flowchart 1300 to identify labels that are semantically related to a query image by identifying labels associated with images that are visually similar to or near duplicates of the query image.

At operation 1310 the image similarity subsystem 124 receives a query image, 1310. In some implementations, this operation 1310 may be accomplished in association with operations 910 and 914 shown in FIG. 9. At the next operation 1320, image features are extracted, 1320. In some implementations, three different processes can be applied to the extracted image features. For example, as described in more detail below, hash-based algorithms can be used to find matches to the whole query image, 1331; feature matching algorithms can be used to find matches to the local features of the query image, 1333; and a computer vision database can be used to find image matches that contain metadata, 1335. A computer vision database is a database storing information that associates a recognized image with real-world facts about the image.

The hash-based algorithm reduces image signature size, in terms of storage and computation cost, and thereby facilitates efficient searching for similar or duplicate images of various resolutions, lighting, cropping, compression, format, color space, and/or any other appropriate non-visual essential properties. For example, the hash-based algorithm described here can be used to generate small values that serve as a signature of an image, which can be processed faster than larger values.

Operation 1331 may use a hash-based algorithm tailored to any specific searching system. In some implementations, a hash-based algorithm may first receive query image data, subsequently perform wavelet transformation, then obtain wavelet coefficients, compress extracted features afterwards, and finally search for matches and present results. The returned results using the hash-based algorithm may serve for various purposes. For example, if a user is interested in the origin of an image, further information related to an image, a different version of an image, verification of information about an image, or other cases related to the whole image features, the hash-based algorithm can be applied and return similar or duplicate image results at operation 1332. Operations 1331 and 1332 can be used to identify images that are near duplicates of a query image, as described below.

An algorithm for detecting and describing local features in images is used at operation 1333. In certain instances, the local-feature algorithm may be an algorithm such as a scale-invariant feature transform, which operates by executing several stages such as detecting scale-invariant features, e.g., features that do not vary based on the scale or resolution of an image, matching and indexing the features, identifying cluster by transformation voting, verifying model by linear least squares, and detecting outliers. Such local-feature algorithms may enable users to search for further information on the query image. For example, if the query image is an image of a building, the local-feature algorithms may find matches for the same building but from different perspectives, at different times, during different events, and other varying features. This enables more relevant information about an object represented in the query image to be found. At operation 1334, local features of the query image are extracted and, in some implementations, matched to other images, e.g., images stored or referenced by an image data store. Operations 1333 and 1334 can be used to identify images that are visually similar to a query image, e.g., as shown in the visually similar images 206 of the user interface 200 shown in FIG. 2A.

In some implementations, at operation 1335, a computer vision database can be used to find metadata describing images, and return descriptive metadata at operation 1336. In some implementations, the computer vision database may be an image recognition application. The query image may be compared with a database of images that have metadata at this operation. For example, the database of images may store metadata about an image such as information about an object displayed in the image. If the image is an image of an object such as a famous landmark, the metadata returned by operation 1336 may be information about the landmark, such as the history and significance of the landmark. If a match can be found, the high quality metadata of the matching image will be returned; otherwise no result is returned. Operations 1335 and 1336 can also be used to identify images that are visually similar to a query image.

The data returned by operations 1332, 1334, and 1336 can together be provided in a new query at operation 1340: at operation 1332, image features for matching the whole query image are extracted by using hash-based algorithms; at operation 1334, image features for matching local features of the query image are extracted by using local-feature algorithms; and at operation 1336, metadata is extracted from a computer vision database that identifies the query image. In some examples, operation 1336 may return no results, for example, if the computer vision database has no metadata describing a particular image. The query of operation 1340 is then issued to a web server, e.g., operating in association with the search system 110 shown in FIG. 1A, at operation 1350. The web server can be any appropriate web server for image search. In some implementations, the web server is used to retrieve search results that match the new query.

At operation 1360, the web server retrieves matching images and their metadata to the query image. In some implementations, the matching process allows for a significant difference between two images when local-feature algorithms are used. For example, two images of the same physical object taken at different vantage points may be significantly different in terms of color, texture, and brightness, but still represent the same physical object. The local-feature algorithms may be substantially effective in matching objects of a distinct graphical pattern, such as an array of geometrical shapes; and the objects may only occupy a small portion of the total image size. The query image can be compared against an image search index that has a corpus size of a first number of images, for example.

The hash-based algorithm may run at a much lower computation cost and therefore can be used to compare the query image to a larger number of images than compared by the local-features algorithm. For example, the hash-based algorithm may be used to compare the query image to a second number of images that are included in an image search index. These comparisons can return results including images that are most relevant to the search query.

Based on the matching images and their metadata, a "best guess" text label, or labels, is computed at operation 1370. In some implementations, operation 1370 involves several operations. For example, the label data store 132, FIG. 1A, may have been populated with labels 136 associated with image references 138 indicating images described by the respective labels 136. Then visually similar or near duplicate images are identified, for example, using the hash-based and local feature algorithms. Subsequently the labels associated with the search image results are aggregated, ranked, and merged as consensus labels and refinement labels. For example, labels associated with the search image results can be assigned a score indicating the likelihood that the label accurately describes the image. For example, the score could be a confidence score, as described with respect to FIG. 7, or a score based on a confidence score and based on other factors. Labels can be ranked based on the score.

In some implementations, the label data store 132 assigns image references 138 to clusters of near duplicate images. Labels 136 associated with one image reference 138 assigned to a cluster may also be semantically related to other image references 138 assigned to the cluster. Information about which image references 138 are assigned to which cluster can be used to identify labels that are semantically related to a query image.

Top-ranked, e.g., a threshold number of top ranked, labels can be selected for further processing. For example, a label having a highest score, such as a highest confidence score, as described with respect to FIG. 7, can be selected as a text query to identify web pages associated with a query image. Alternatively, users may choose to provide a label which is different from the one based on the label scoring or ranking, e.g., as described with respect to FIG. 8, and this label can be used for further processing.

At operation 1380, a further search is conducted to obtain various result-page-blocks, e.g. label search results 204, visually similar images 206, and near duplicate images 208, as shown in FIG. 2A, by using all information from previous matches, e.g. matching image and their metadata, "best guess" text labels, etc., In some implementations, the result-page-blocks may include one or more additional text labels, which may also describe topics of the image. The text labels may also be used as links to further searches, e.g., alternative labels 218 shown in FIG. 2A. The result-page-blocks may also include similar or near-duplicate images of other resolutions. The set of images may be presented as links that brings a user to an image search style landing page, e.g., as shown in the user interface 200 of FIG. 2A, and provide access to the near-duplicate image, as well as the web page that is referred to by the near-duplicate image. An accompanying link may also be provided to go to a full set of image search style results of other resolutions. The result-page-blocks may also include text based web results, with and/or without matching images. The result-page-blocks may further include similar image results that are a set of images that are visually similar to the query image but are not considered near-duplicates of the query image, and can be presented with one or more labels, e.g., a "best guess" label and alternative labels. The retrieved result-page-blocks are then presented at operation 1390.

Figure 14:
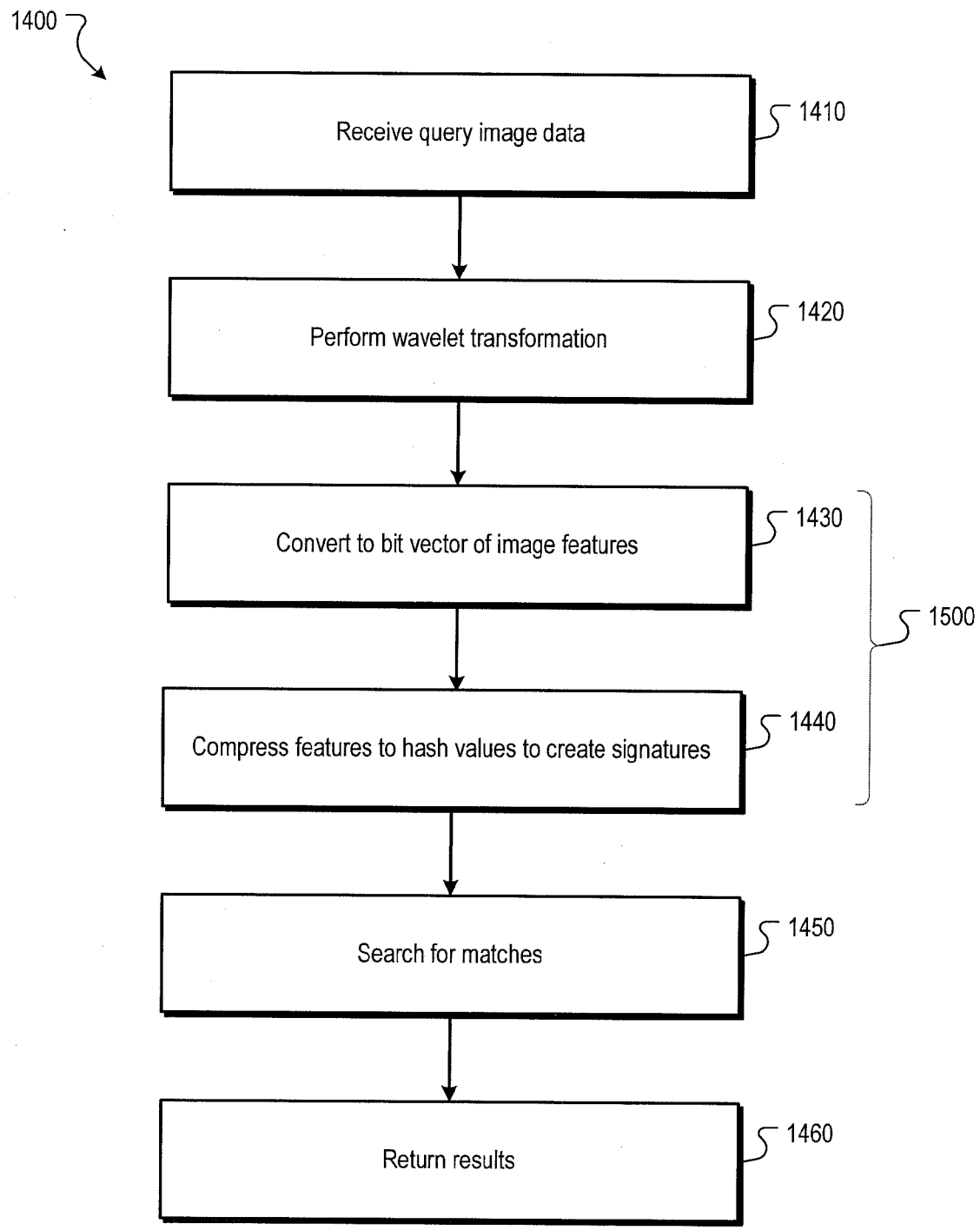
FIG. 14 shows an example process of using a hash-based algorithm for image search.

FIG. 14 shows an example process 1400 for performing a hash-based image search. The process 1400 can be performed, for example, in association with operation 1331 shown in FIG. 13. The process 1400 can be used to identify near-duplicate images for a query image. In some implementations, the near-duplicate images for the query image are other images having a hash value that matches the computed hash value of the query image.

The process 1400 starts with operation 1410 where the query image data is received. The data may be in various formats and color-spaces. For example, the image data may be in formats that are Joint Photographic Experts Group (JPEG), Tagged Image File Format (TIFF), Portable Network Graphics (PNG), Bitmap Image File (BMP), Graphics Interchange Format (GIF), or any other appropriate image formats. The image data may be in color spaces that are Red-Green-Blue color space (RGB), subtractive color space (CMYK), television color spaces (e.g. YIQ), Hue-Saturation-Value color space (HSV), or any other appropriate color spaces.

At operation 1420, a wavelet transformation is applied to the query image. In some implementations, the wavelet transformation encodes both frequency and spatial information in the wavelet function. For example, a Haar wavelet may be used as it is a certain sequence of rescaled "square-shaped" functions that form a wavelet family. Haar wavelet transformation cross-multiplies a function against the Haar wavelet with various shifts and stretches. As a result, the Haar wavelet can be used efficiently in computing image signatures, e.g., image signatures 148 shown in FIG. 1A. For example, wavelet decompositions allow for good image approximation with only a few coefficients, such as those of the largest magnitude. Wavelet decompositions may also be used to extract and decode edge information. The information provided by wavelet coefficients is independent of the original image resolution. Finally, the computation time is relatively low and linear to the size of the image. However, other wavelet transformations may also be applicable.

At operation 1430, image features are converted to a bit vector. The bit vector may include parameters representing the query image, such as the wavelet coefficients, average color, aspect ratio, color histograms, edge features, etc. For example, for a 64 by 64, pixels, image, there are 4096 different wavelet coefficients for each color channel. Instead of using all of these coefficients, it is favorable to "truncate" the sequence, keeping only the coefficients with largest magnitudes. This truncation accelerates the search for a query image and reduces storage for the database. Truncating the coefficients may also improve the discriminatory power, e.g., the ability to distinguish two different images. Similarly, the quantization of each wavelet coefficient can serve several purposes: speeding the search, reducing the storage, and actually improving the discriminatory power of the metric. The quantized coefficients retain little or no data about the precise magnitudes of major features in the images.

At operation 1440, each bit-vector representing the image features is compressed to hash values to create an image signature of the query image. This may include truncation and quantization of the hash values. At operation 1450, the image signature of the query image is used to compare with the image signatures in the image database. If the image signature of the query image is found in the database, then images corresponding to the image signature are near duplicates of the query image. For example, the image similarity subsystem 124 can compare the image signature of the query image to image signatures 148 associated with image references 148 to determine if the query image is a near duplicate of any of the images referenced by the image references 148. At operation 1460, results are returned, e.g., returned by the image similarity subsystem 124 to the search system 110.

Figure 15:
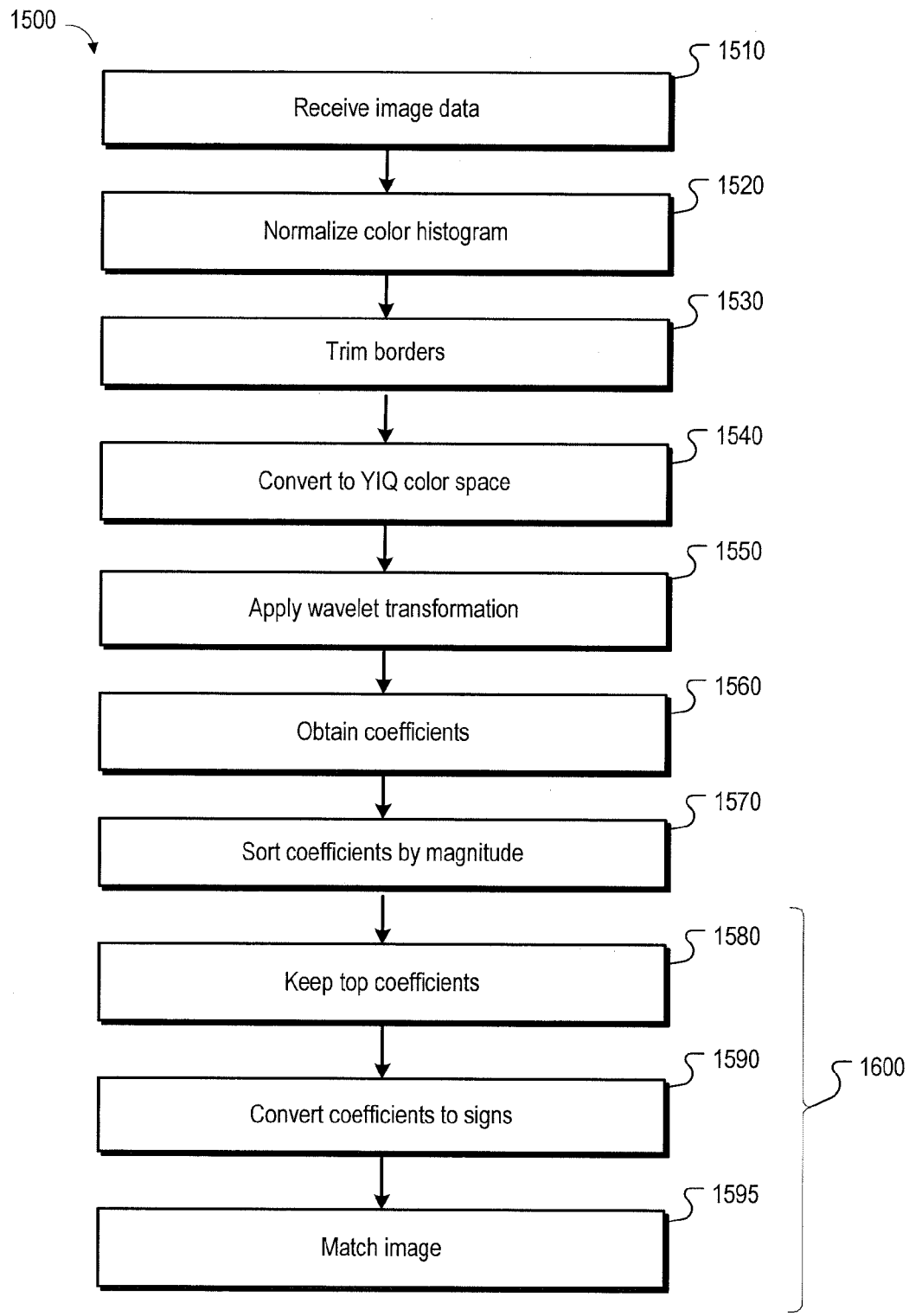
FIG. 15 shows an example process for performing a hash-based search.

FIG. 15 shows an example process 1500 for performing a hash based search. The process 1500 can be performed as part of operations 1430 and 1440 in the process 1400 of FIG. 14. The process 1500 starts with operation 1510 where query image data is received. The data may have been normalized to a certain standard. For example, the query image may be in a different color space than the standard color space. The query image may be in color spaces that are Red-Green-Blue color space (RGB), subtractive color space (CMYK), television color spaces (e.g. YIQ), Hue-Saturation-Value color space (HSV), or any other appropriate color spaces. In some implementations, the query image data may first be represented by a standard color space, such as the YIQ color space.

At operation 1520, the color histogram of the query image is normalized, color histogram equalization. This allows for duplicate images of various lighting to be aligned to the normalized level scale. For example, in a low contrast image, histogram equalization usually increases the global contrast of many images, especially when the usable data of the image is represented by close contrast values. Through this adjustment, the intensities can be better distributed on the histogram. This allows for areas of lower local contrast to gain a higher contrast. Histogram equalization accomplishes this by effectively spreading out the most frequent intensity values. In some implementations, another technique other than color histogram normalization is used. For example, the colors can be normalized using gray-world color balancing, which is a technique that operates similarly to auto-white-balancing in cameras. Other techniques that can be used can include intensity range scaling, or intensity histogram equalization.

At operation 1530, an image border, if any, is trimmed or cropped. In some implementations, the image border is a portion of the image that is of uniform color, e.g., white, and/or consistent texture or pattern that borders at least a portion of the image.

The query image is converted to YIQ color space at operation 1540. At operation 1550, the wavelet transformation is applied to the query image. In some implementations, the wavelet transformation encodes both frequency and spatial information in the wavelet function. In particular, a Haar wavelet may be used because it is a certain sequence of rescaled "square-shaped" functions that form a wavelet family. The Haar wavelet transformation cross-multiplies a function against the Haar wavelet with various shifts and stretches. Wavelet decompositions allow for good image approximation with only a few coefficients, such as those of the largest magnitude. Wavelet decompositions may also be used to extract and decode edge information. The information provided by wavelet coefficients are independent of the original image resolution. Finally, the computation time is relatively low and linear to the size of the image.

At operation 1560, wavelet coefficients are obtained. Subsequently, the wavelet coefficients are sorted by magnitude at operation 1570; and at operation 1580, a number of top coefficients are retained for use at the next operation 1590, where these retained coefficients are converted to signs, plus one, zero and minus one. The signs can be represented as a two bit value, e.g., 01 for a negative sign, 10 for a positive sign, and 00 for a zero value having no sign. In some implementations, the wavelet transformed data may be expressed with wavelet coefficients in a bit vector of the number of image size by color bands by signs. For example, if the image is 64 by 64 pixels, the number of wavelet coefficients may be 64 by 64 by 3 colors and by 2 signs. Additional bits for average color, aspect ratio and other image properties may be included in the bit vector. The bit vector may then be compressed, for example, by mapping bits from a longer vector to a shorter vector. This may include truncation and quantization of the hash values. For example, the vector may be truncated such that only the coefficients with largest magnitudes are retained. This truncation accelerates the search for a query image and reduces storage for the database. Similarly, the quantization of each wavelet coefficient can serve several purposes: speeding the search, reducing the storage, and actually improving the discriminatory power of the metric. Generally, the quantized coefficients retain little or no data about the precise magnitudes of major features in the images.

At operation 1595, the converted signs are used to generate the signature of the image. A hash function is applied to the bit vector containing the converted signs, and, in some implementations, other image attributes. The result of the hash function can be compared to hash values stored in association with other images in a database to identify a set of matching images to output. For example, referring to FIG. 1A, the result of the hash function for the query image 142 can be compared to image signatures 148 stored in the image data store 132 of the image similarity subsystem 124 to determine if any images referenced in the image data store 132, e.g., referenced by image references 146, have a matching image signature 148. The matching images are near duplicate images of the query image, and references to the image can be provided in response to the query image.

Figure 16:
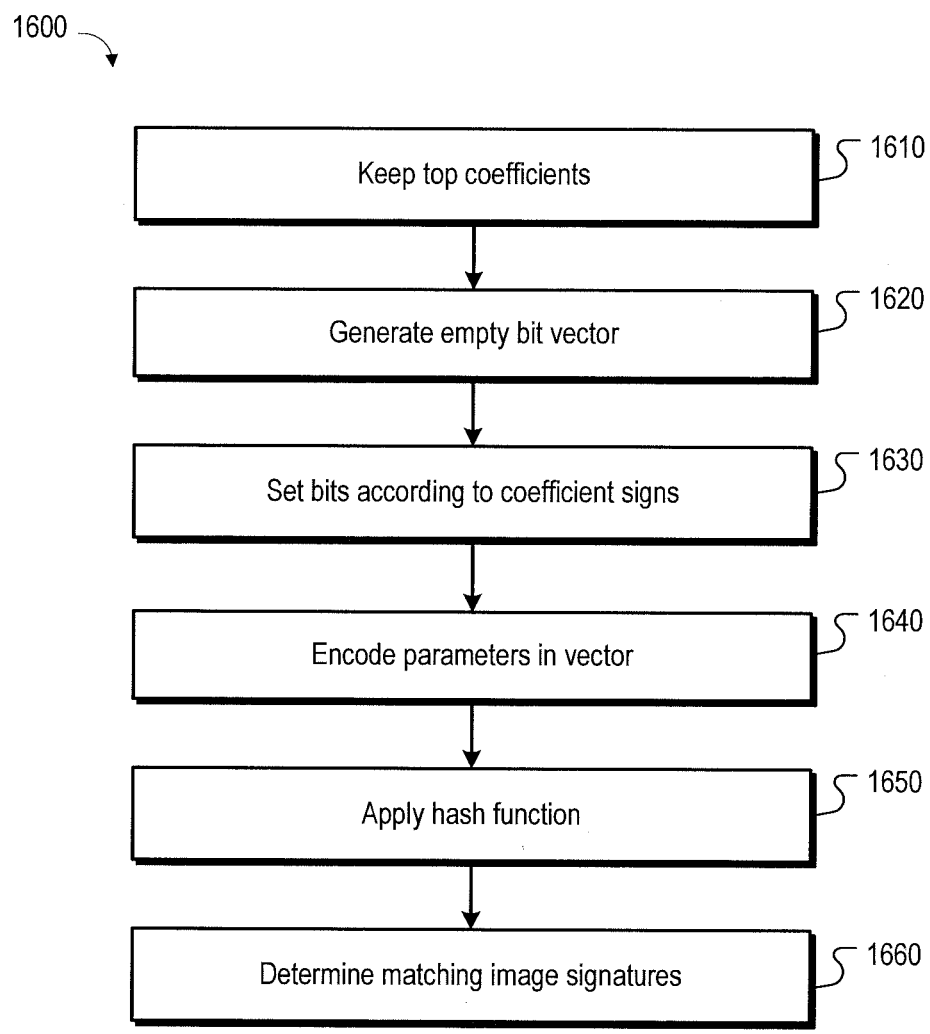
FIG. 16 shows an example process for performing a portion of a hash based search.

FIG. 16 shows an example process 1600 for performing a portion of a hash based search. The process 1600 can be performed as part of operations 1580, 1590, and 1595 in the process 1500 of FIG. 15. As described above, after a wavelet transformation is applied, e.g., to a query image, the largest wavelet coefficients are retained, and then only the signs of those largest coefficients are retained. The process 1600 demonstrates an example of this functionality in greater detail. The process begins by keeping the top wavelet coefficients, e.g., the coefficients having the largest magnitude, 1610. The process generates an empty bit vector, 1620. The process sets the bits of the vector according to the signs of the coefficients, 1630. For example, the process can set the bits of the vector in a way that the signs are each represented as a two bit value within the vector, e.g., 01 for a negative sign, 10 for a positive sign, and 00 for a zero value having no sign. The process encodes parameters in the vector, 1640. For example, the process can set bits of the vector to values representing parameters such as average color, aspect ratio and other image properties. The process applies a hash function to the bit vector, 1650. The result of the hash function can have a smaller number of bits than the result of operation 1640. The result of the hash function can serve as an image signature of an image. The process can use the result of operation 1650 to determine matching images, e.g., near duplicate images, based on matching image signatures, 1660. For example, the result of operation 1650 can be an image signature of a query image, and the image signature can be compared to other image signatures in a database, e.g., image data store 132 shown in FIG. 1A, to determine if other image references in the database have an image signature that match the image signature of the query image. Image references having a matching image signature to the query image can be identified as referencing near duplicate images to the query image.

In some implementations, the result of operation 1650 can be stored in a database, e.g., image data store 132 shown in FIG. 1A, in association with the query image as an image signature of the query image.

In some implementations, the result of operation 1640 can be used as a large image signature. The larger value returned by operation 1640 can be stored, e.g., stored in an image data store 132 or stored in a label data store 134 shown in FIG. 1A, alongside a smaller image signature. An image reference, e.g., image references 146 or image references 138 shown in FIG. 1A, can be located by searching for the smaller image signature, and then the larger value can be used to verify that an image reference associated with the smaller image signature is a near duplicate image of a query image. In some implementations, a larger value can be used that incorporates a greater number of wavelet coefficients.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA, field programmable gate array, or an ASIC, application-specific integrated circuit. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network, e.g., the Internet, and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, by one or more processors, a query image;
   accessing, by the one or more processors, a database of hash values of other images;
   obtaining a set of wavelet coefficients for the query image;
   identifying, from the set of wavelet coefficients and by the one or more processors, a subset of the wavelet coefficients in which each wavelet coefficient has at least a threshold magnitude;
   applying a hash function to a bit-vector of data representing signs of the subset of wavelet coefficients for the query image to obtain a hash value representing the query image;
   comparing, by the one or more processors, the hash value of the query image to the hash values of the other images; and
   identifying, by the one or more processors and based on the comparison, a near duplicate image having a hash value that matches the hash value of the query image.

2. The method of claim 1 wherein the bit-vector of data comprises two-bit values each representing a sign of a wavelet coefficient among the subset of wavelet coefficients.

3. The method of claim 1 wherein the hash value comprises a smaller number of bits than the bit-vector.

4. The method of claim 1 wherein the bit-vector of data further comprises data representing an average color of the image.

5. The method of claim 1 wherein the bit-vector of data further comprises data representing an aspect ratio of the image.

6. The method of claim 1 further comprising removing a uniform color border of the query image before computing the hash value of the query image.

7. The method of claim 1 wherein the database of hash values of other images stores hash values in association with references to the other images.

8. The method of claim 7 wherein the references to the other images are stored in association with references to web pages each containing at least one of the other images.

9. The method of claim 1 wherein the query image is received in response to a selection on a client device of the query image, the query image displayed within a web page displayed on the client device.

10. A system, comprising:
a communications interface configured to receive a query image;
a data retrieval interface configured to access a database of hash values of other images; and
a processor configured to:
obtain a set of wavelet coefficients for the query image;
identify, from the set of wavelet coefficients, a subset of the wavelet coefficients in which each wavelet coefficient has at least a threshold magnitude;
apply a hash function to a bit-vector of data representing signs of the subset of wavelet coefficients for the query image to obtain a hash value representing the query image;
compare the hash value of the query image to the hash values of the other images; and
identify, based on the comparison, a near duplicate image having a hash value that matches the hash value of the query image.

11. The system of claim 10 wherein the bit-vector of data comprises two-bit values each representing a sign of a wavelet coefficient among the subset of wavelet coefficients.

12. The system of claim 10 wherein the hash value comprises a smaller number of bits than the bit-vector.

13. The system of claim 10 wherein the bit-vector of data further comprises data representing an average color of the image.

14. The system of claim 10 wherein the bit-vector of data further comprises data representing an aspect ratio of the image.

15. The system of claim 10 wherein the processor is further configured to remove a uniform color border of the query image before computing the hash value of the query image.

16. The system of claim 10 wherein the database of hash values of other images stores hash values in association with references to the other images.

17. The system of claim 16 wherein the references to the other images are stored in association with references to web pages each containing at least one of the other images.

18. The system of claim 10 wherein the query image is received in response to a selection on a client device of the query image, the query image displayed within a web page displayed on the client device.

19. Non-transitory computer readable media storing software comprising instructions executable by a processing device and upon such execution cause the processing device to perform operations comprising:
receiving a query image;
accessing a database of hash values of other images;
obtaining a set of wavelet coefficients for the query image;
identifying, from the set of wavelet coefficients and by the one or more processors, a subset of the wavelet coefficients in which each wavelet coefficient has at least a threshold magnitude;
applying a hash function to a bit-vector of data representing signs of the subset of wavelet coefficients for the query image to obtain a hash value representing the query image;
comparing the hash value of the query image to the hash values of the other images; and
identifying, based on the comparison, a near duplicate image having a hash value that matches the hash value of the query image.

20. The computer readable media of claim 19 wherein the bit-vector of data comprises two-bit values each representing a sign of a wavelet coefficient among the subset of wavelet coefficients.

21. The computer readable media of claim 19 wherein the hash value comprises a smaller number of bits than the bit-vector.

22. The computer readable media of claim 19 wherein the bit-vector of data further comprises data representing an average color of the image.

23. The computer readable media of claim 19 wherein the bit-vector of data further comprises data representing an aspect ratio of the image.

24. The computer readable media of claim 19, the operations further comprising removing a uniform color border of the query image before computing the hash value of the query image.

25. The computer readable media of claim 19 wherein the database of hash values of other images stores hash values in association with references to the other images.

26. The computer readable media of claim 25 wherein the references to the other images are stored in association with references to web pages each containing at least one of the other images.

27. The computer readable media of claim 19 wherein the query image is received in response to a selection on a client device of the query image, the query image displayed within a web page displayed on the client device.

\* \* \* \* \*